United States Patent [19]

Savage et al.

[11] 4,044,806
[45] Aug. 30, 1977

[54] TREE PROCESSING MACHINE

[75] Inventors: Donald D. Savage; Robert V. Chambers; Maurice T. Mills, all of Marietta, Ga.

[73] Assignee: B. J. Powell, Atlanta, Ga. ; a part interest

[21] Appl. No.: 552,318

[22] Filed: Feb. 24, 1975

Related U.S. Application Data

[63] Continuation-in-part of Ser. No. 293,482, Sept. 29, 1972, Pat. No. 3,881,533.

[51] Int. Cl.$^2$ ............................................ A01G 23/08
[52] U.S. Cl. .............................. 144/309 AC; 144/2 Z; 144/3 D; 144/34 E
[58] Field of Search ..................... 144/3 D, 2 Z, 34 R, 144/34 E, 309 AC; 83/928; 214/3, 147 G; 212/145

[56] References Cited

U.S. PATENT DOCUMENTS

| | | | |
|---|---|---|---|
| 3,385,333 | 5/1968 | Eynon | 144/34 R |
| 3,643,711 | 2/1972 | Puna | 144/3 D |
| 3,688,821 | 9/1972 | McColl | 144/3 D |
| 3,817,303 | 6/1974 | Kantola et al. | 144/34 R |
| 3,826,295 | 7/1974 | Johnson et al. | 144/34 E |
| 3,871,427 | 3/1975 | Widegren et al. | 144/34 E |
| 3,882,910 | 5/1975 | Peltola et al. | 144/34 R |

*Primary Examiner*—Othell M. Simpson
*Assistant Examiner*—W. D. Bray

*Attorney, Agent, or Firm*—B. J. Powell

[57] ABSTRACT

A tree processing machine for felling and processing standing trees into predetermined lengths which includes generally a prime mover capable of turning in a short radius with a relatively short support frame as compared to the prior art mounted on the prime mover, a carriage frame pivotally mounted on the support frame about a roll axis generally vertically aligned with and parallel to the longitudinal centerline of the prime mover, a main support bed pivotally mounted at its upper end to the forward end of the carriage frame for pivoting from a vertical position in which the lower end thereof is near the ground to a horizontal position above the prime mover, a set of traversing drive assemblies mounted on the support bed for holding a tree against the bed and for moving the tree longitudinally with respect to the bed, a cutting assembly mounted on that end of the bed opposite its pivoted end and movable with the bed as well as with respect to the bed for selectively felling trees and cutting them into selected lengths, an adjustable delimbing mechanism carried by the bed and carriage frame for selectively delimbing the tree as it is driven by the traversing assembly, topping means carried by the carriage frame for shearing the top from the tree, an automatic control means for controlling the operation of the bed, cutting assembly, traversing drive assemblies, delimbing assembly, and topping means.

23 Claims, 31 Drawing Figures

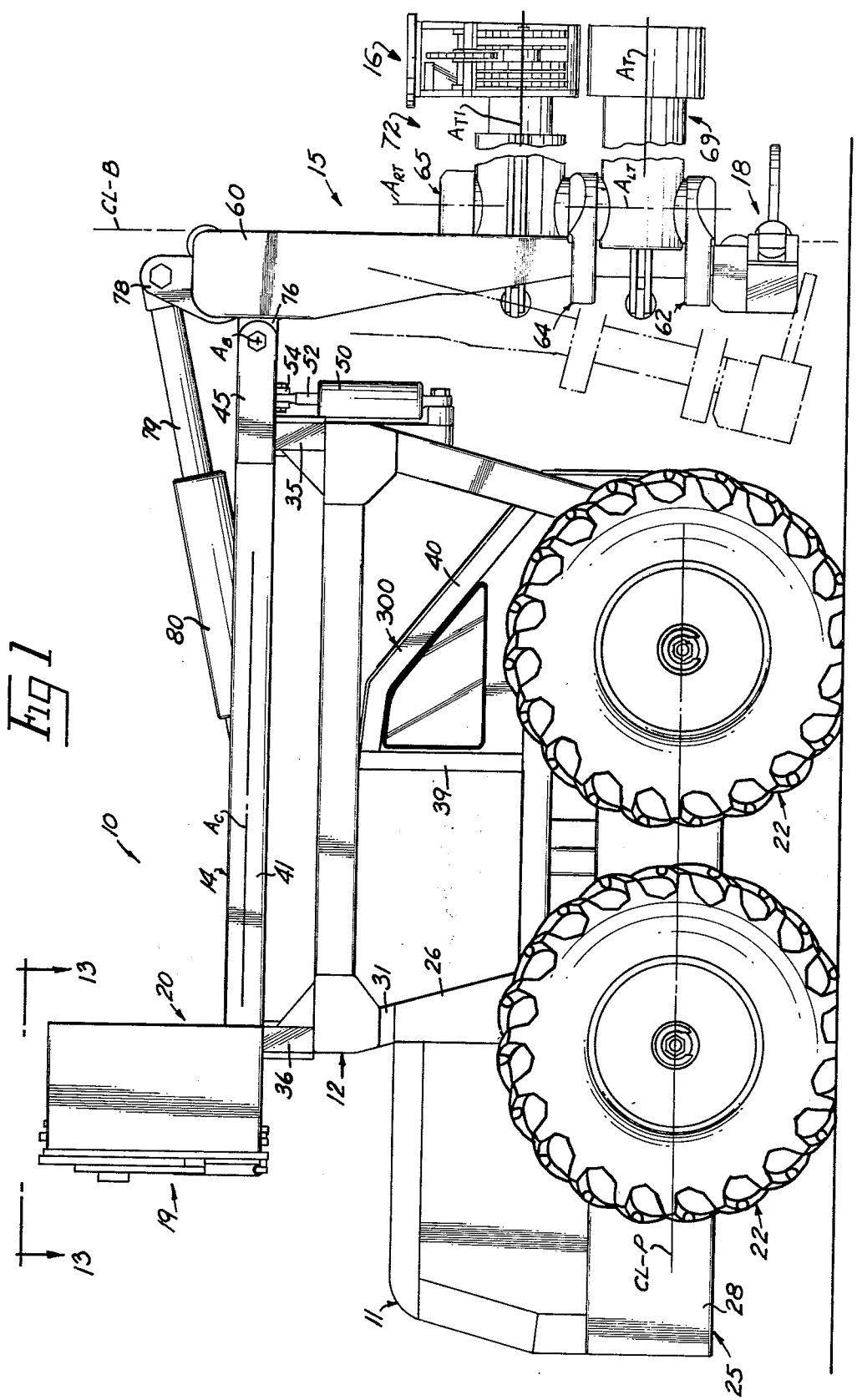

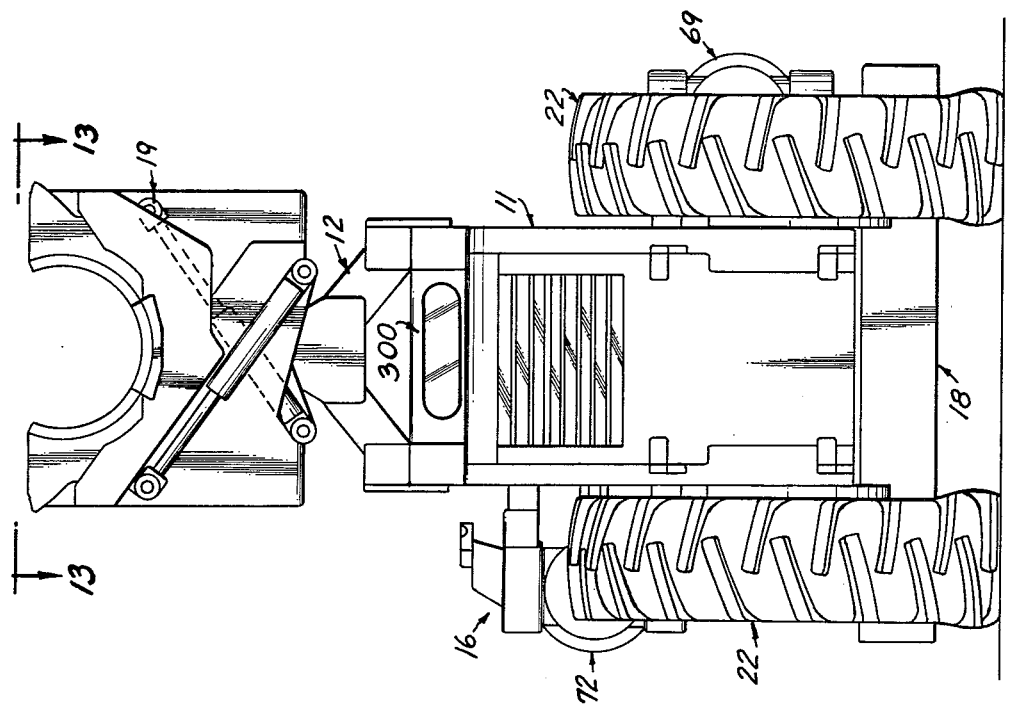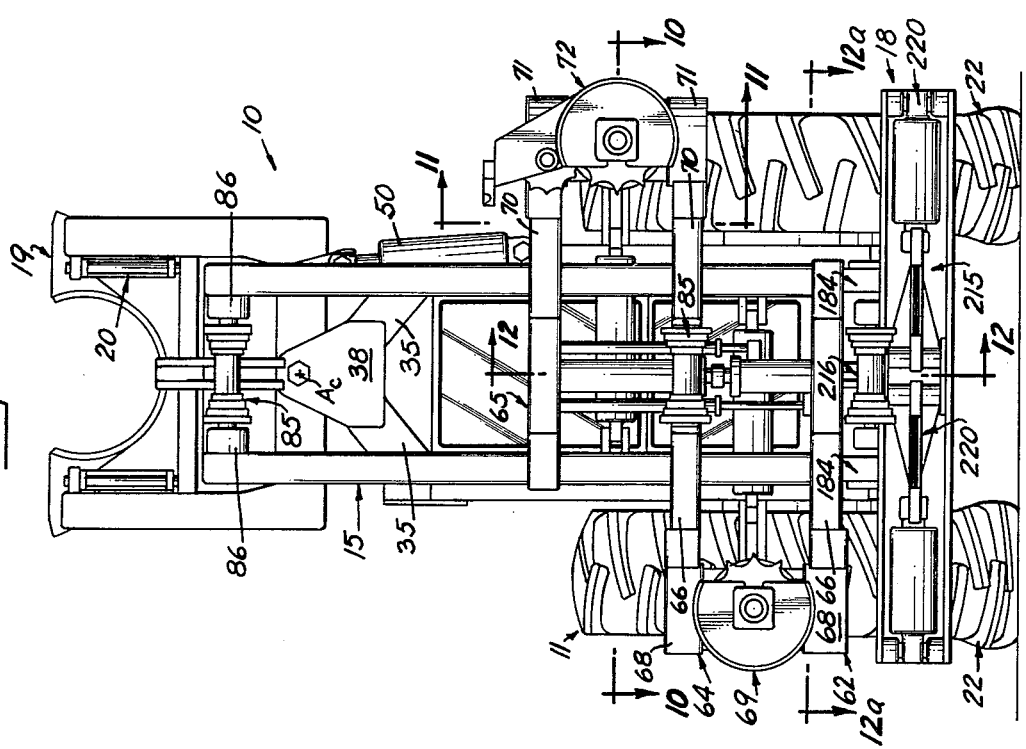

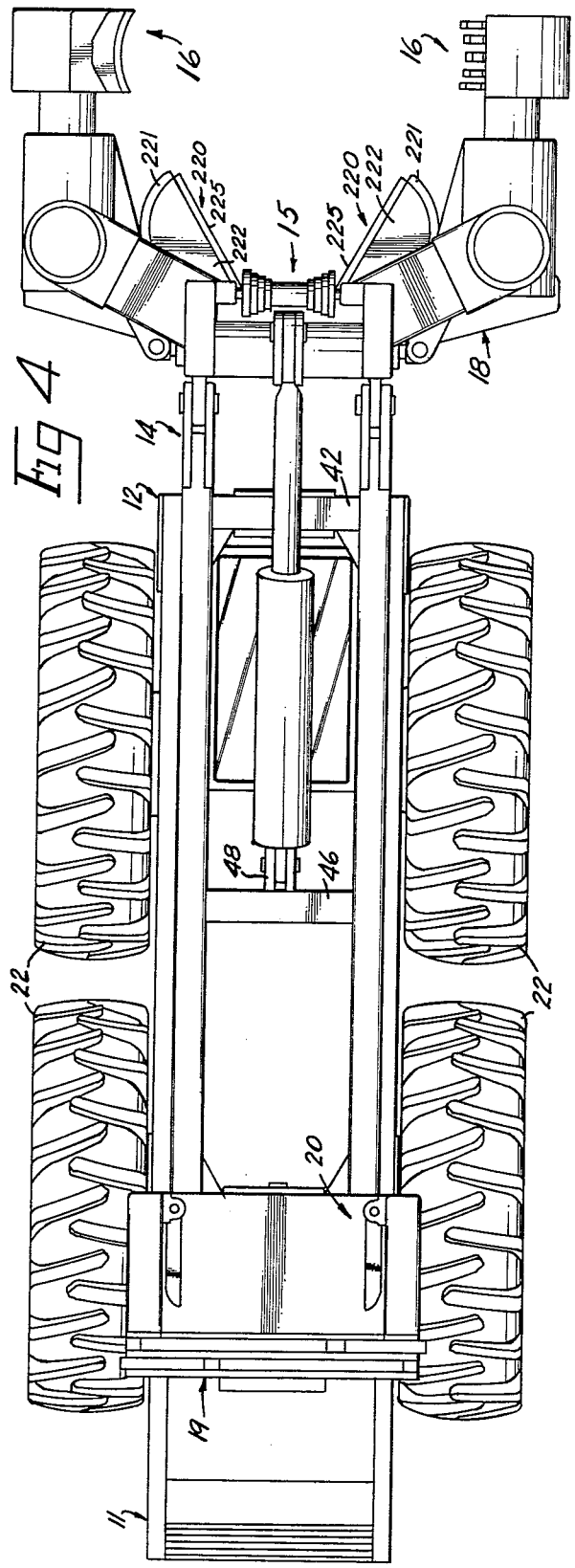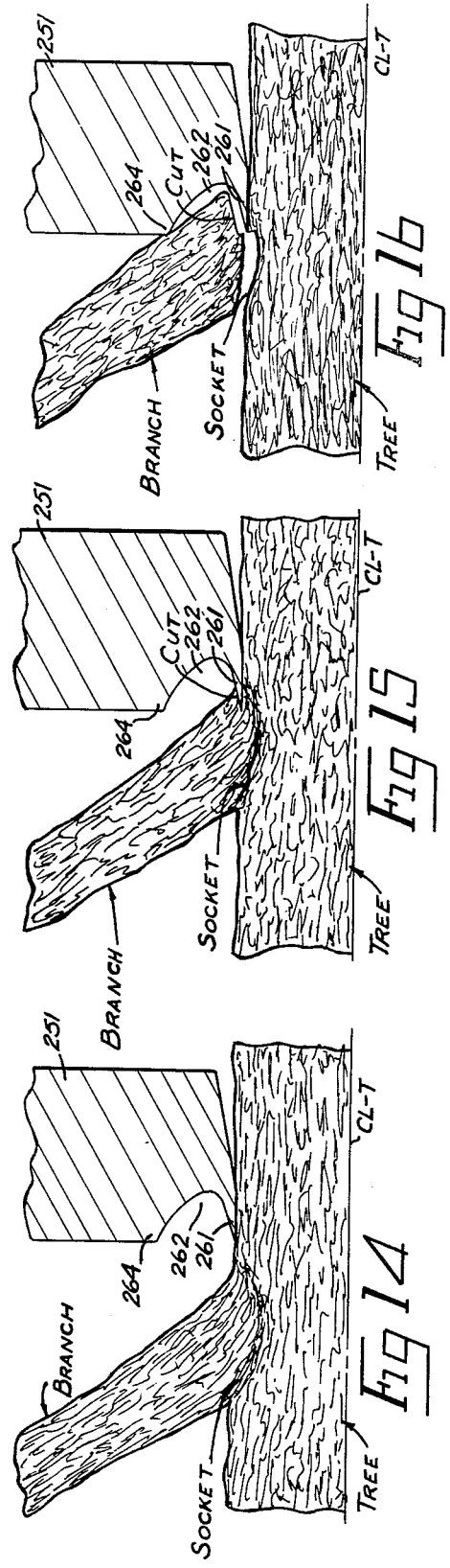

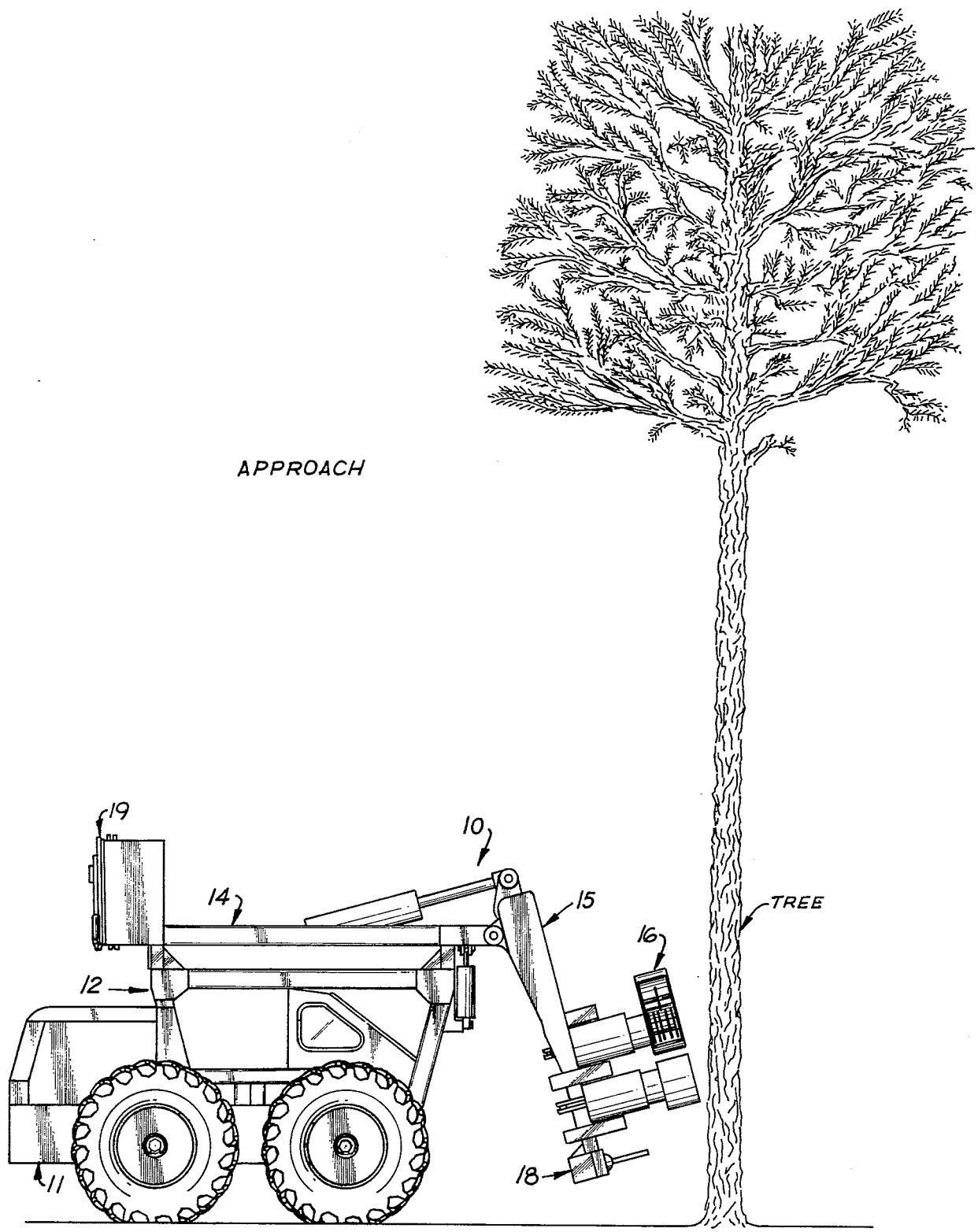

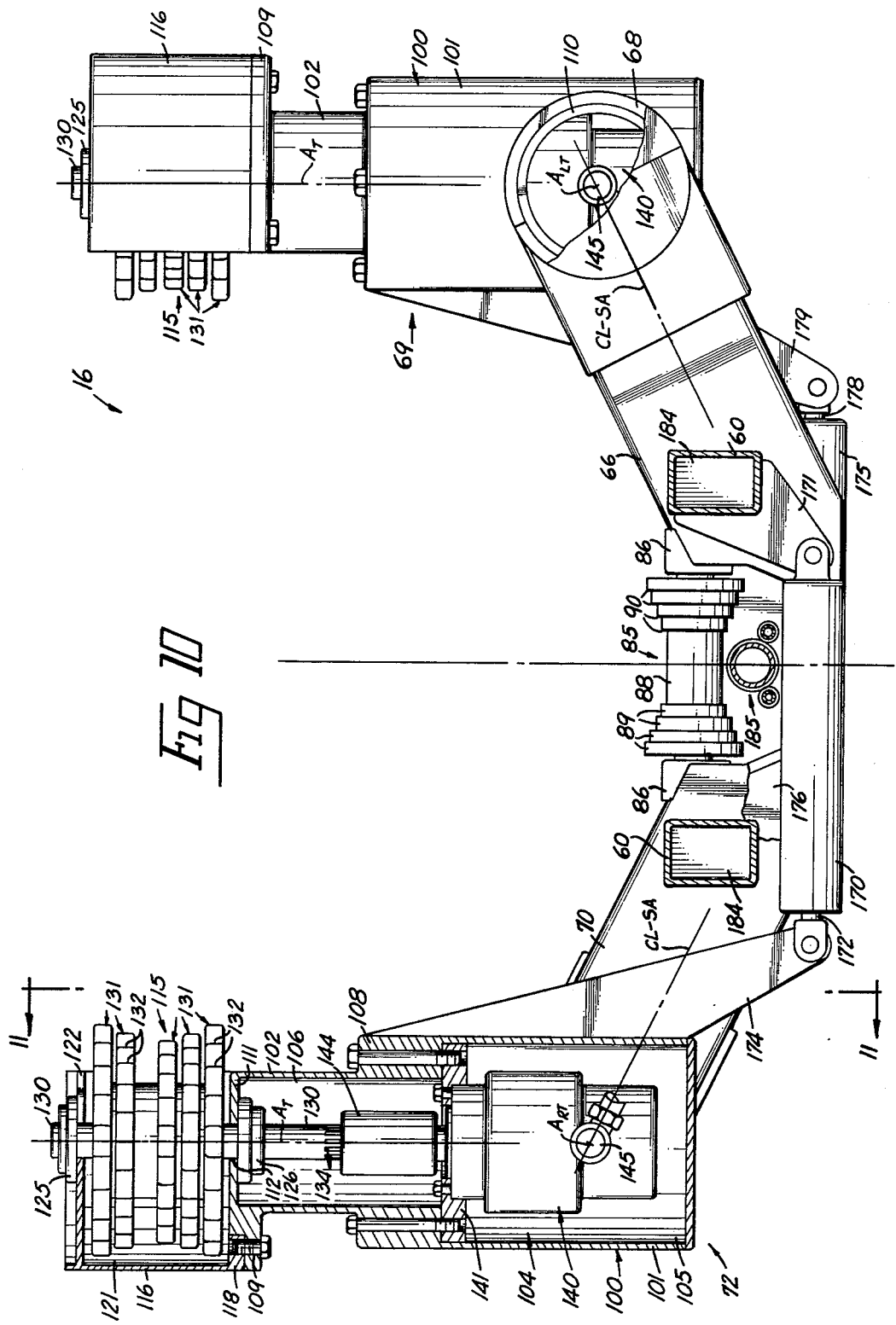

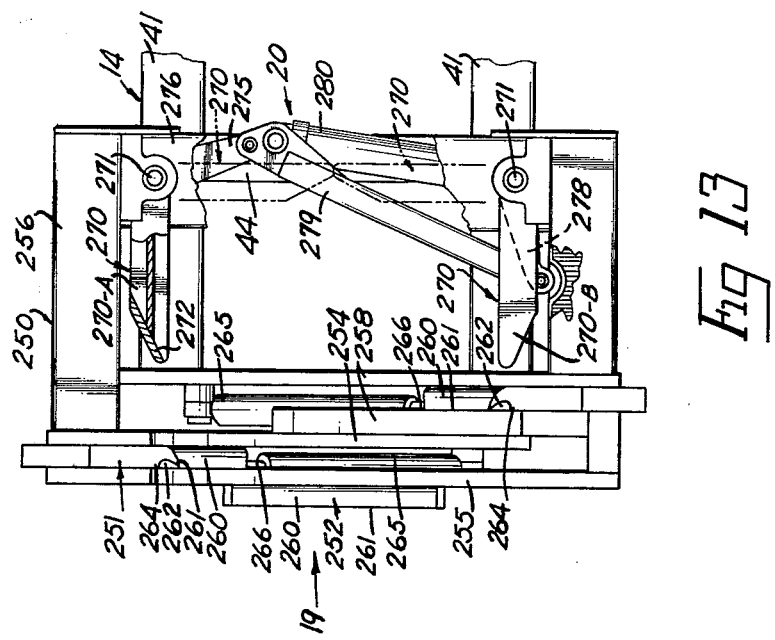
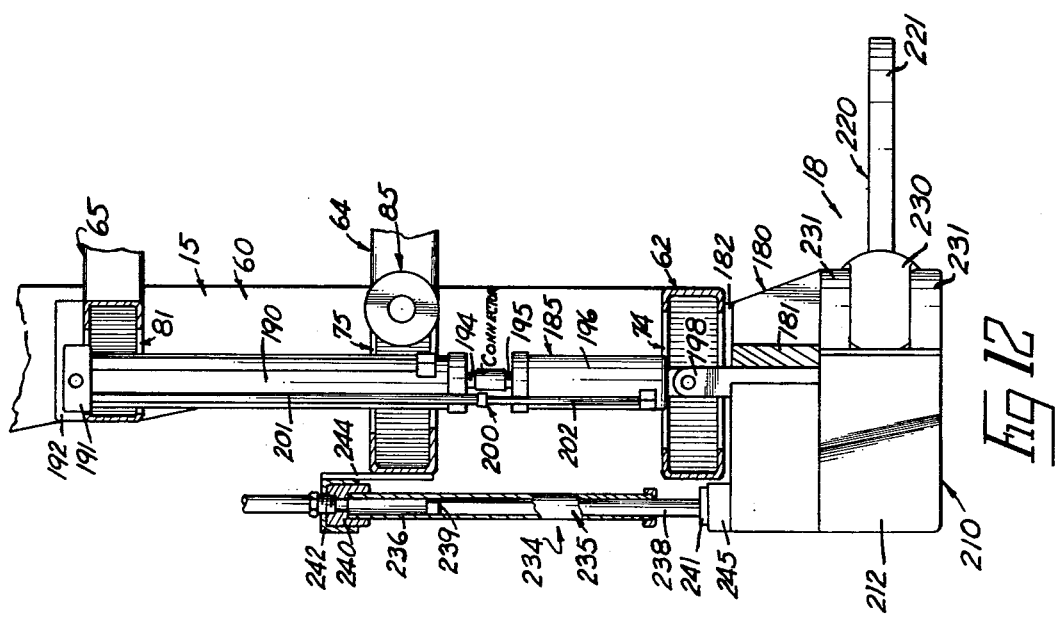

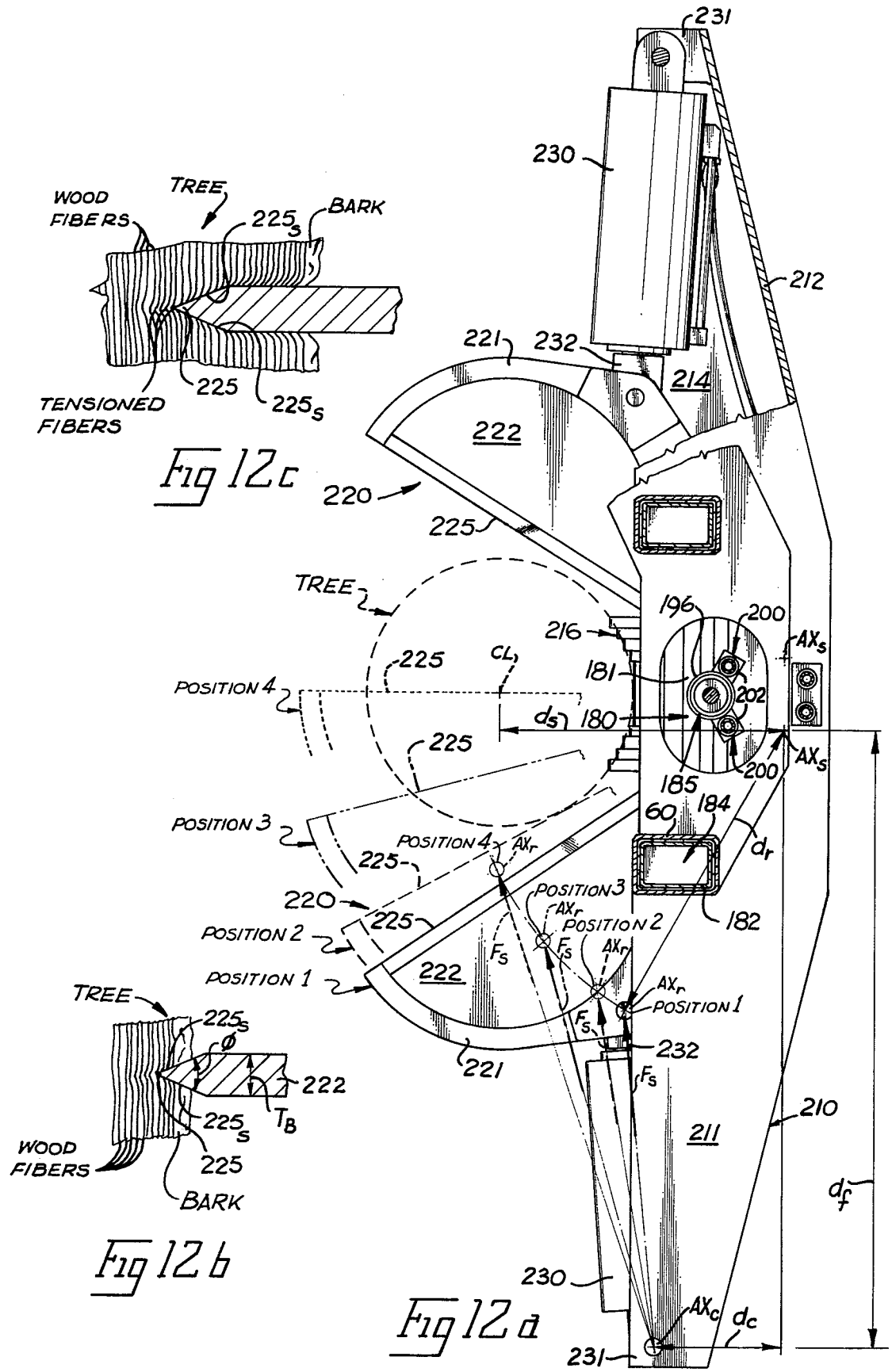

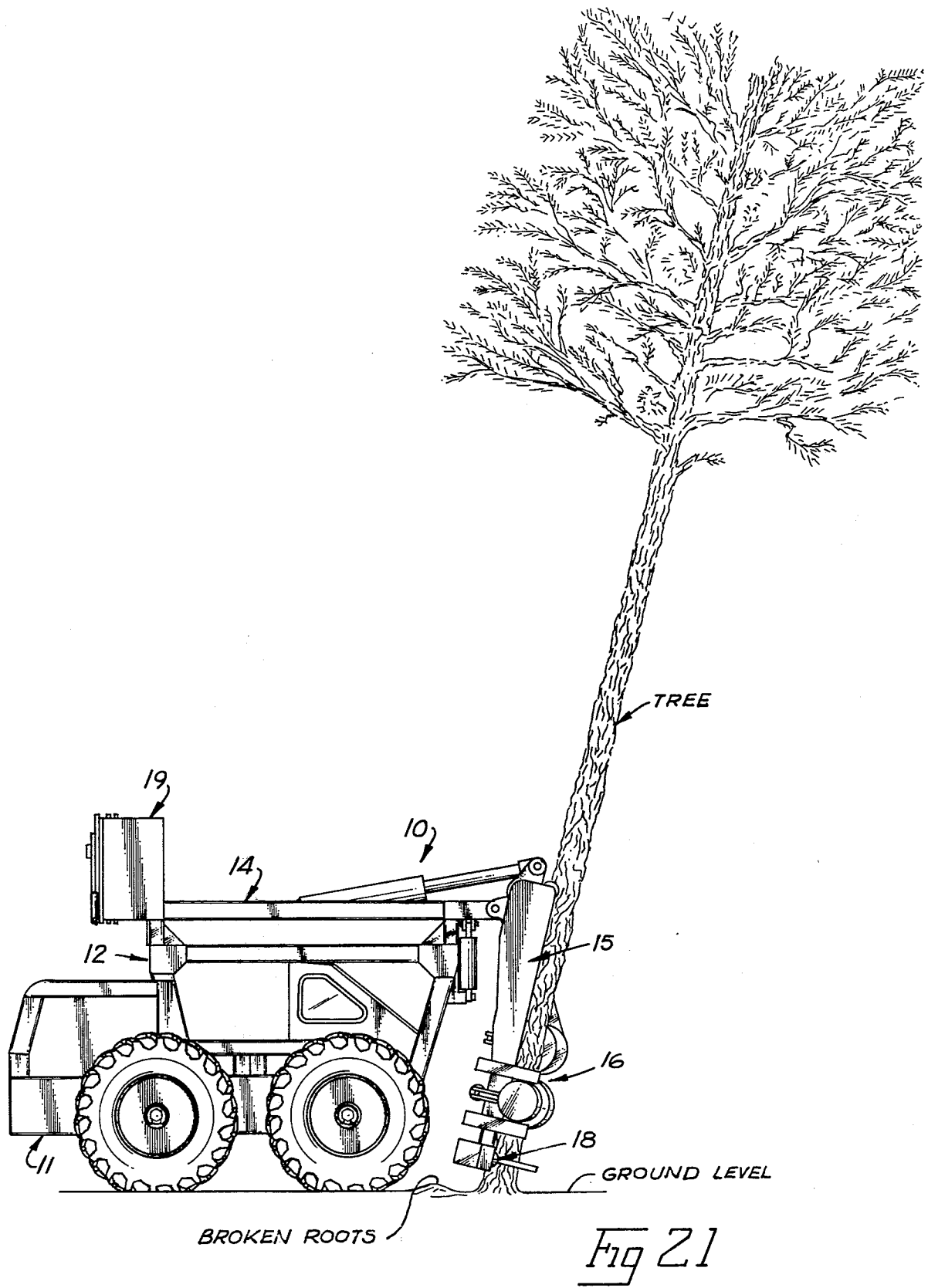

4,044,806

TREE PROCESSING MACHINE

CROSS-REFERENCE TO RELATED APPLICATIONS

This application is a continuation-in-part of our co-pending application Ser. No. 293,482 filed Sept. 29, 1972 for "Tree Harvester", now U.S. Pat. No. 3,881,533.

BACKGROUND OF THE INVENTION

Tree harvesting machines are available on the market today which perform one or more of the following operations: felling, delimbing and bucking of trees. One of the problems with these prior art tree harvesting machines was that they were extremely large in size and complicated in construction thereby rendering them prohibitively expensive to construct and maintain. Moreover, the bulkiness of the machine and the lack of maneuverability of the machine substantially precluded the use of the machine when selective harvesting or thinning of trees was desired. Also, once a tree was felled, the prior art machines generally were unable to maneuver with the felled tree before processing was complete.

SUMMARY OF THE INVENTION

These and other problems and disadvantages associated with the prior art are overcome by the invention disclosed herein by providing a tree harvesting machine that is small and compact with a high degree of maneuverability. Moreover, the invention is simple in construction, operation and maintenance and capable of automatic operation for rapidly felling, delimbing and bucking trees. Once the tree is felled, the machine with the tree thereon can be easily maneuvered prior to processing of the tree.

The machine includes generally a prime mover capable of turning in a short radius with a relatively short base support frame as compared to the prior art mounted on the prime mover. A carriage frame is pivoted on the top of the base support frame about a roll axis generally parallel to, vertically aligned with and spaced above the longitudinal centerline of the prime mover. A main support bed is pivotally mounted at its upper end to the forward end of the frame for pivoting from a vertically position in which the lower end thereof is near the ground to a horizontal position above the prime mover. A cutting assembly is mounted on the end of the bed opposite its pivoted end and movable with the bed as well as with respect to the bed for selectively felling trees and cutting them into selected lengths. The support bed is equipped with a set of traversing drive assemblies for holding a tree stationary with respect to the bed during felling of the tree and for selectively driving the tree longitudinally across the bed. An adjustable delimbing mechanism is carried by the bed and carriage frame for selectively delimbing the tree as it is driven by the traversing drive assemblies. Topping means is provided for shearing the top from the trees. Automatic control means is provided for controlling the operation of the bed, cutting assembly, traversing drive assemblies, delimbing assembly, and topping means.

These and other features and advantages of the invention will become more apparant upon consideration of the following specification and accompanying drawings wherein like characters of reference designate corresponding parts throughout the several views and in which:

BRIEF DESCRIPTION OF THE DRAWINGS

FIG. 1 is a side elevational view of the machine embodying the invention;

FIG. 2 is a front elevational view of the machine of FIG. 1;

FIG. 3 is a rear elevational view of the machine of FIG. 1;

FIG. 5 is a reduced schematic side view of the invention approaching a standing tree to be felled;

FIG. 9 is a reduced schematic side view of the invention during delimbing of a tree;

FIG. 10 is an enlarged transverse cross-sectional view of the support bed taken along line 10—10 in FIG. 2;

FIG. 12 is an enlarged cross-sectional view taken along line 12—12 in FIG. 2 showing the stump clear mechanism;

FIG. 12a is an enlarged transverse cross-sectional view taken along line 12a—12a in FIG. 2;

FIG. 12b is an enlarged partial cross-sectional view showing the cutting assembly in operation;

FIG. 12c is a view similar to FIG. 12b further showing the cutting assembly in operation;

FIG. 13 is a top view of the topper mechanism taken along line 13—13 in FIGS. 1 and 3;

FIG. 14 is a schematic view showing the delimber blade approaching the branch on a tree;

FIG. 15 is a schematic view showing the initial cut being made in the branch;

FIG. 16 is a schematic view showing the branch being separated;

FIGS. 21-23 are views illustrating the invention removing a tree stump with the tree.

Figure 6:
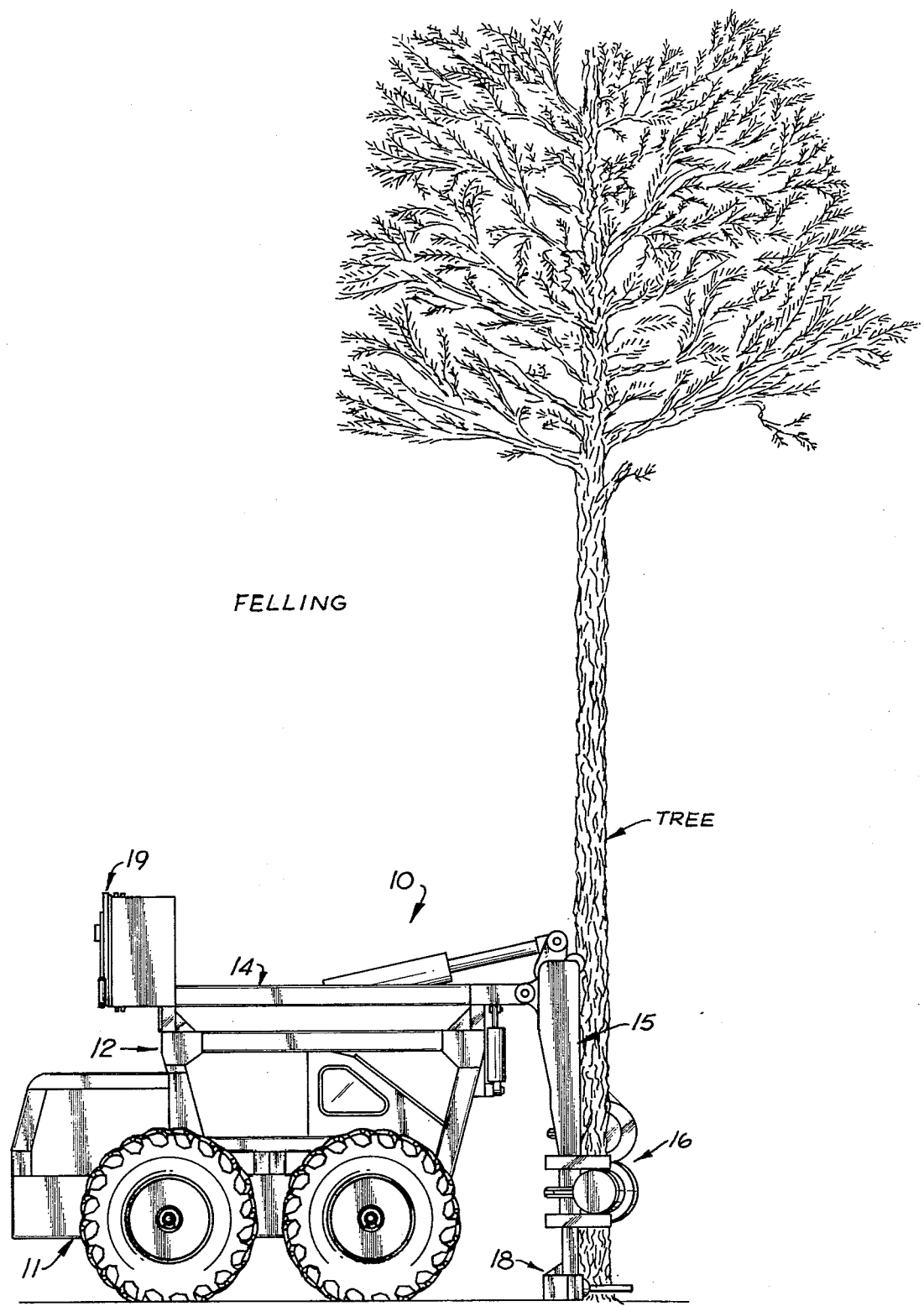
FIG. 6 is a reduced schematic side view of the invention gripping a tree to be felled.
Figure 7:
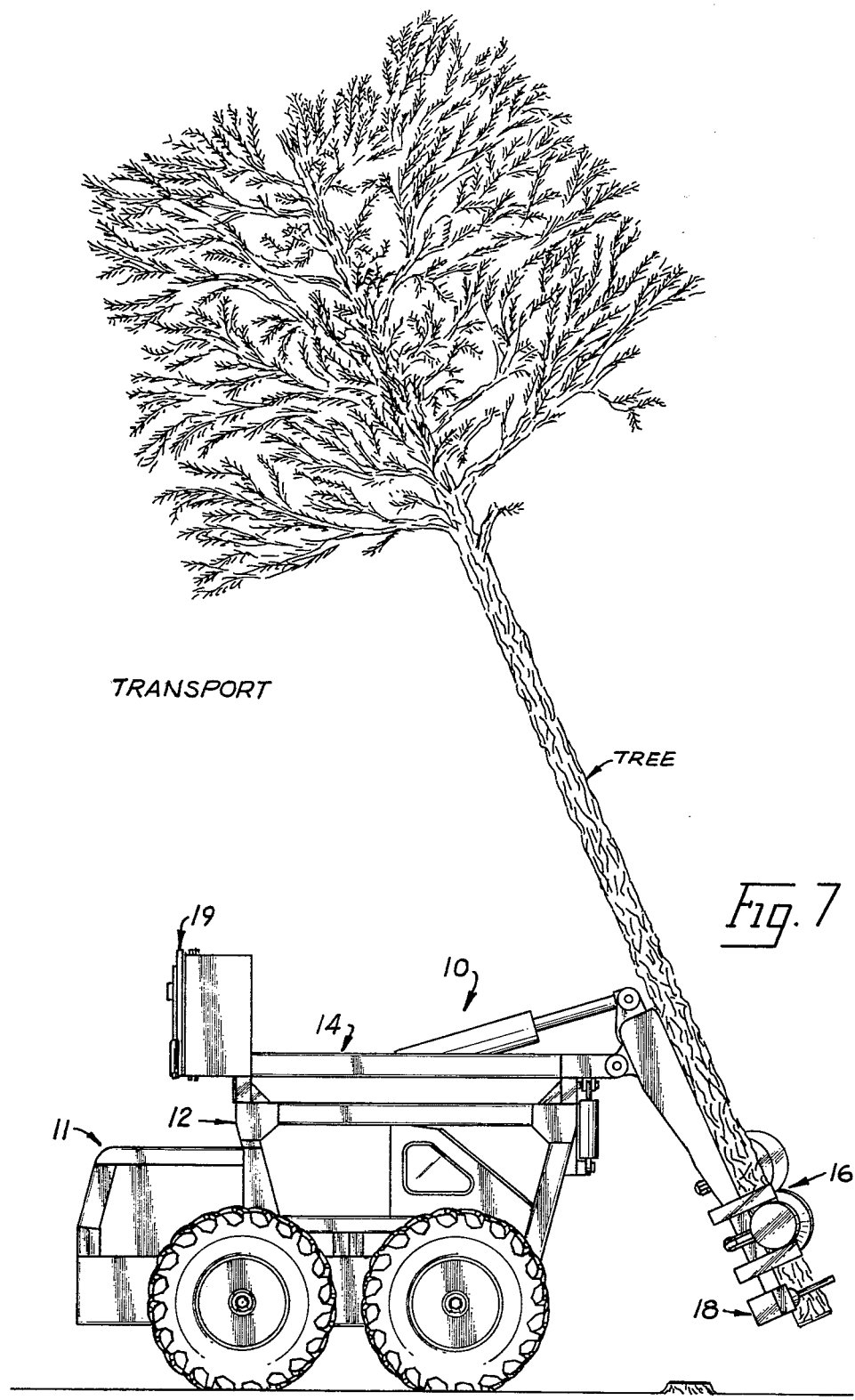
FIG. 7 is a reduced schematic side view of the invention gripping a felled tree in transporting position.
Figure 8:
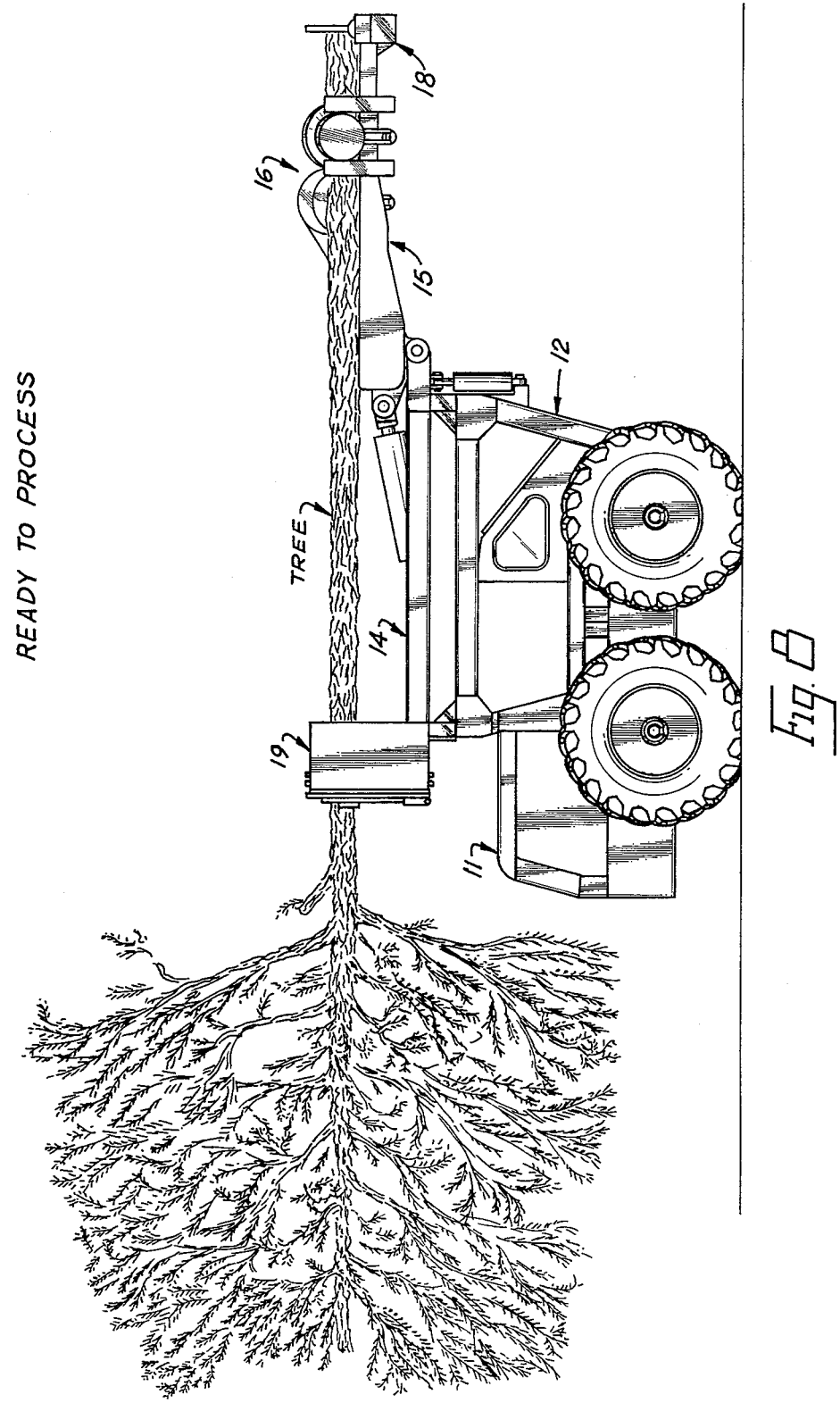
FIG. 8 is a reduced schematic side view of the invention holding a felled tree ready for delimbing.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring primarily to FIGS. 1-9, the tree processing machine 10 includes generally a prime mover 11 having a base support frame 12 thereon. A carriage frame 14 is pivoted to the top of the base support frame 12 so that its pivot axis $A_C$ is generally vertically aligned with, parallel to and spaced above the longitudinal centerline CL-P of the prime mover 11. A bed 15 is pivoted at its upper end to the front of the carriage frame 14 about pivot axis $A_B$ and movable from a vertical position in front of the prime mover 11 to a horizontal position generally parallel to the axis $A_C$. A traversing mechanism 16 is carried by bed 15 adjacent the extending end thereof to hold the tree onto the bed and to move the tree lengthwise across the bed after it is felled. A cutting assembly 18 is movably carried by the extending end of bed 15 for felling the tree on the bed and cutting it into selected lengths. A delimber unit 19 is mounted on the rear end of the carriage frame 14 to receive the tree trunk when the bed 15 is horizontal and for delimbing the tree as the traversing mechanism 16 moves the tree lengthwise. A topper 20 is mounted on the carriage frame 14 just forward of the delimber unit 19 to cut the top from the tree.

The bed 15 is arranged so that its longitudinal centerline CL-B is generally in vertical alignment with the longitudinal centerline CL-P of the prime mover 11. This maintains generally vertical alignment between the centerline CL-T of the tree and centerline CL-P of the prime mover to balance the machine 10.

The prime mover 11 is driven toward the tree with the bed 15 in its down position as seen in FIG. 5. The position of the carriage frame 14 about axis $A_C$ is adjusted until the centerline CL-B of bed 15 is aligned with the centerline CL-T of the standing tree. The bed 15 is then pivoted about the bed pivot axis $A_B$ until the centerline CL-B of bed 15 is parallel to the centerline CL-T of the standing tree and the machine 10 driven toward the tree until the tree trunk rests against the bed 15 as seen in FIG. 6. The traversing mechanism 16 is then closed as seen in FIG. 6 to tightly clamp the tree against the bed 15. The cutting assembly 18 is operated to sever the tree adjacent the ground. While the traversing mechanism 16 continues to grip the felled tree on bed 15, the bed 15 is pivoted up about axis $A_B$ through the position shown in FIG. 7 so that the vehicle 10 can be stably maneuvered to the processing location. The bed 15 is further pivoted upwardly to its upper horizontal position seen in FIG. 8 so that the tree trunk is operatively associated with the delimber unit 18. The traversing mechanism 16 is operated to move the tree lengthwise of itself and longitudinally of the bed 15 as seen in FIG. 9. The delimber unit 19 is operated during traversing of the tree to delimb same. The traversing mechanism 16 may be intermittently stopped and the cutting assembly 18 operated to cut the tree into selected lengths. When the diameter of the tree trunk reaches a predetermined minimum diameter, the topper 20 is operated to shear the top out of the tree and allow the rest of the tree trunk to be processed.

PRIME MOVER

The prime mover 11 as seen in FIG. 1–3 has a base 25 with four wheels 22 arranged on a short wheelbase. The wheels 22 on opposite side of base 25 are independently driven by hydraulic motors from hydraulic pumps driven by an internal combustion engine (not shown). This arrangement is commonly referred to in the industry as using the skid steer principle and allows the prime mover to turn in its own length thus rendering it highly maneuverable. Such prime movers ae commercially available. One such prime mover is disclosed in application Ser. No. 439,736, filed Feb. 5, 1974, now U.S. Pat. No. 3,907,053.

FRAMES

Figure 4:
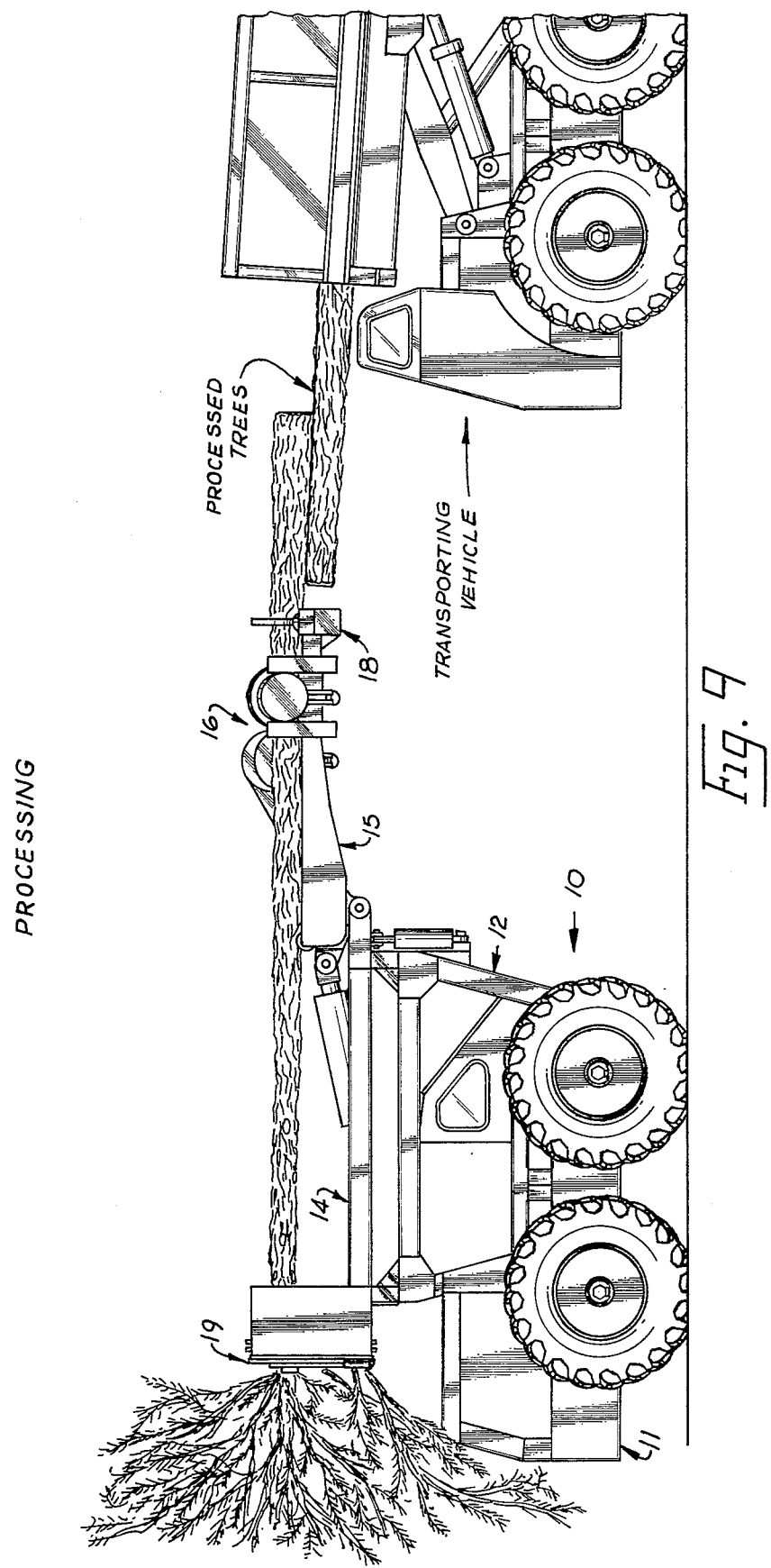
FIG. 4 is a top view of the invention.

The support frame 12 as seen in FIGS. 1–4 is mounted on the base 25 of the prime mover 11 and extends upwardly therefrom. The frame 12 includes a pair of spaced apart front upstanding support pillars 30 mounted on the front end of base 25 and extending upwardly therefrom so that their uppermost ends are spaced forwardly of the base 25. A pair of short rear upstanding support pillars 31 are mounted intermediate the ends of base 25 on stanchions 26 and extend upwardly therefrom. A pair of side rails 32 extend between the upper ends of the pillars 31 and pillars 30. An inverted V-shaped front cross-brace 35 connects the upper ends of the front pillars 30 and a like rear cross-brace 36 connects the upper ends of the rear pillars 31 as best seen in FIG. 4. The bight of each cross-brace 35 and 36 is provided with a pair of upstanding pivot ears 38. The pivot ears 38 of the cross-braces 35 and 36 are arranged along the pivot axis $A_C$ as will become more apparent. Intermediate support columns 39 connect the side rails 32 with the base 25 and angular braces 40 connect columns 39 with the front support pillars 30.

The carriage frame 14 is pivoted on the ears 38 of frame 12 as seen in FIG. 4 about the axis $A_C$. Frame 14 includes a pair of spaced apart, generally parallel side beams 41 connected adjacent their front ends by a front pivot crossbeam 42 and connected adjacent their rear ends by a rear pivot crossbeam 44. The pivot crossbeams 42 and 44 are pivotally mounted between the ears 38 so that frame 14 pivots about axis $A_C$ and the side beams 41 are generally parallel to and equally spaced from axis $A_C$. The front ends of each side beam 41 is provided with a pair of forwardly projecting pivot ears 45 which pivotally mount the bed 15 therebetween for movement about axis $A_B$. It will be noted that axis $A_C$ is normal to axis $A_C$ and pivots about axis $A_C$ as the frame 14 is pivoted. The rear ends of side beams 41 mount the delimber unit 19 and topper 20 thereon as will become more apparent. A drive crossbeam 46 connects the side beams 41 intermediate their ends and is provided with a pair of forwardly projecting cylinder pivot ears 48 as will become more apparent. A roll cylinder 50 is pinned to a bracket 51 on one of the front support pillars 30 and its piston rod 52 is pinned to a bracket 54 on one of the side beams 41 of frame 14. Thus, as the piston rod 52 is extended and retracted as will become more apparent, the frame 14 will be pivoted about the axis $A_C$.

BED

The bed 15 as best seen in FIGS. 1–4 is generally rectangular in shape and includes a pair of side members 60 joined at their ends by a crosstube 61. A lower crossarm 62 connects the lower ends of the side members 60 and extends outwardly from members 60 to the left as seen in FIG. 2 as will become more apparent. A common crossarm 64 connects the side members 60 a first prescribed distance above the lower crossarm 62 and extends outwardly from members 60 both to the left and right as seen in FIG. 2. An upper crossarm 65 connects side members 60 a second prescribed distance above the common crossarm 64 and extends outwardly from members 60 to the right as seen in FIG. 2. The crossarms 61, 64 and 65 are generally parallel to each other. The left lower subarms 66 of crossarms 62 and 64 extending to the left in FIG. 2 are provided with aligned journals 68 about the pivot axis $A_{LT}$ of the left subassembly 69 of the traversing mechanism 16 as will become more apparent. The upper right subarms 70 of crossarms 64 and 65 extending to the right as seen in FIG. 2 are provided with aligned journals 71 about the pivot axis $A_{RT}$ of the right subassembly 72 of the traversing mechanism 16 as will become more apparent. A cutout 74 is provided in the lower crossarm 62 between side members 60 and a cutout 75 is provided in the common crossarm 64 between the side members 60 as will become more apparent.

A pair of aligned ears 76 are provided on the back of side members 60 adjacent their upper ends. The ears 76 are pinned to the bed pivot ears 45 on carriage frame 14 so that the bed 15 pivots about the axis $A_B$ independently of frame 14 and pivots with the carriage frame 14 about the axis $A_C$. Thus, the centerline CL-B of bed 15 always lies in a plane in which the axis $A_C$ lies as will become more apparent. A pair of driving ears 78 are centrally located on the crosstube 61 between members 60 are pinned to the piston rod 79 of bed tilt cylinder 80. The cylinder 80 is pinned to the cylinder pivot ears 48 on drive crossbeam 46 of carriage frame 14 so that the bed 15 will be tilted up or down about axis $A_B$ as piston rod 79 is retracted or extended. It will further be noted that the axes $A_{LT}$ and $A_{RT}$ are both generally parallel to the centerline CL-B of bed 15, equally spaced from the centerline CL-B on opposite sides thereof, and displaced outwardly from the plane of the bed 15 so that the centerlines CL-SA of subarms 66 and 70 define included angles $\beta$ with the working plane of bed 15 as seen in FIG. 10.

Positioning rollers 85 as seen in FIG. 2 are rotatably mounted between the side members 60 of bed 15 at spaced apart locations thereon. One roller 85 is mounted between the top ends of side members 60 by a switch actuating mounting 86 so that when the roller 85 is forced toward bed 15, a switch will be actuated as will become more apparent. Another roller 85 is mounted within the cutout 75 in the common crossarm 64. The rollers 85 support the tree thereon so that the tree can roll thereover lengthwise of itself during traversing as will become more apparent. Each of the rollers 85 has a central cylindrical portion 88 and a plurality of side-by-side circular step portions 89 at both ends thereof. Each step portion 89 has a larger diameter than the next inner portion 89 so that a gripping shoulder 90 is formed on the inside edge of each portion 89 as best seen in FIG. 10. The shoulders 90 grip a tree in such a manner that the tree will center on the rollers 85 and the shoulders will prevent the tree from rotating about its centerline once centered. A cutout 81 is also provided in the upper crossarm 65 between the side members 60 of bed 15.

TRAVERSING MECHANISM

The traversing mechanism 16 is best seen in FIGS. 1, 2, 4, 10 and 11. Mechanism 16 serves to both clamp the tree onto the bed during the felling operation and maintain the tree against the bed during the remaining processing steps. Mechanism 16 includes the upper right subassembly 72 pivoted between journals 71 in the right subarms 70 on bed 15 and the lower left subassembly 69 pivoted between the journals 68 on the left subarm 66. Because the subassemblies 69 and 72 are generally mirror images of each other, only subassembly 72 will be described in detail with like characters of reference applied to left subassembly 69.

Figure 11:
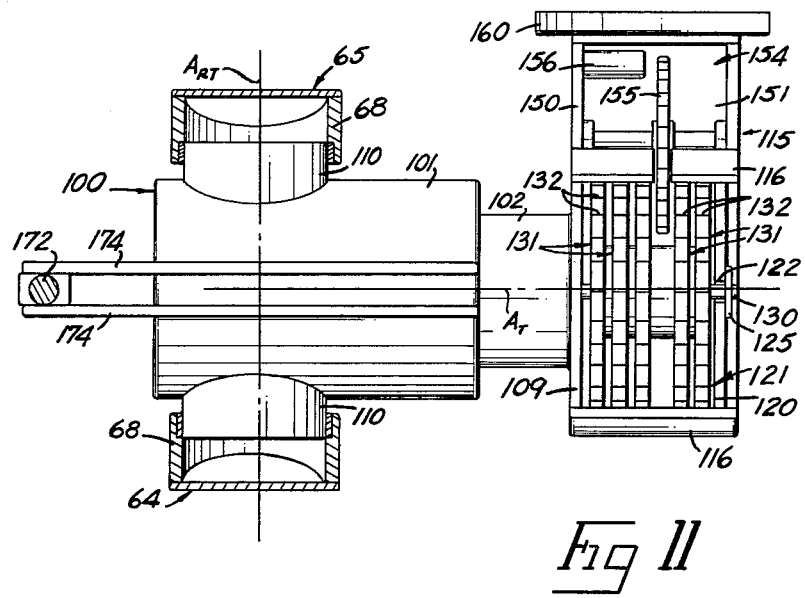
FIG. 11 is an enlarged face view of one of the traversing arm assemblies taken along line 11—11 in FIGS. 2 and 10.

As best seen in FIGS. 10 and 11, the subassembly 72 includes a tubular housing 100 with a large diameter section 101 at one end and a reduced diameter section 102 at the other. Sections 101 and 102 are concentric about a common axis $A_T$. A stepped passage 104 is defined through housing 100 with a large diameter motor chamber 105 in the section 101 and smaller diameter shaft chamber 106 in the section 102. An annular mounting shoulder 108 in passage 104 is provided between sections 101 and 102 and an annular sprocket mounting flange 109 is provided around the outside of the distal end of the reduced diameter section 102. The distal end of section 102 is closed by an end plate 111 with a central shaft hole 112 therethrough.

The housing 100 is rotatably mounted in the journals 71 by a pair of diametrically opposed tubular trunions 110 mounted on the near end of the large diameter section 101 and centered along a common centerline perpendicular to the axis $A_T$. The trunions 110 have a central passage therethrough communicating with the chamber 105 to allow access for the hydraulic plumbing as will become more apparent. It will be noted that the common centerline of trunions 110 coincide with the axis $A_{RT}$ so that subassembly 72 pivots about axis $A_{RT}$.

A sprocket drive unit 115 is carried on flange 109 of the housing 100 to engage the tree on bed 15 as housing 100 is pivoted inwardly around axis $A_{RT}$. The unit 115 includes a tubular guard 116 centered on axis $A_T$ with a mounting ring 118 inside its near end and a generally circular end plate 119 closing the distal end of guard 116. The flange 109, guard 116 and end plate 119 are cut along a chord on the insides thereof to define an open mouth 120 to sprocket chamber 121 inside guard 116 lying in a plane generally parallel to the axes $A_{RT}$ and $A_T$ and spaced inwardly of the axis $A_T$. An inwardly opening slot 122 is provided in end plate 119 which extends from the center thereof outwardly to the open mouth 120. A bearing block 125 is positioned in the center of the outside of end plate 119 and a like bearing block 126 is positioned on the inside of the end plate 111 of housing 100 so that they are aligned about axis $A_T$. A sprocket shaft 130 is rotatably mounted between bearing blocks 125 and 126 and a plurality of drive sprockets 131 are ganged on shaft 130 within chamber 121 so that rotation of shaft 130 drivingly rotates sprockets 131. The sprockets 131 have sharpened peripheral teeth 132 for engaging the periphery of the tree as will become more apparent. Also, the diameters of sprockets 131 vary to conform to the average tree diameter. That end of the sprocket shaft 130 extending into the shaft chamber 106 is provided with splines 134 as will become more apparent.

A hydraulic drive motor 140 is mounted in motor chamber 105 in housing 100 on a mounting ring 141 attached to the motor mounting shoulder 108. The projecting end of the drive shaft 142 of motor 140 extending into shaft chamber 106 is provided with an internally splined coupling 144 which drivingly mates with the splines 134 on sprocket shaft 130. Thus, it will be seen that the motor 140 and sprocket 131 rotate about axis $A_T$ and that the ports of motor 140 are centered on the axis $A_{RT}$ so that a rotary coupling 145 may be used in the hydraulic plumbing to the motor.

In addition the right upper subassembly 72 includes a subhousing 150 as seen in FIG. 11 on top of guard 116 with a measuring subchamber 151 therein having an inwardly opening mouth 152 lying in the same plane as the mouth 120 in guard 116. A measuring unit 154 is housed in the subhousing 150 with a peripherally toothed measuring sprocket 155 rotatably journalled in subhousing 150 about an axis parallel to the axis $A_T$. The teeth on measuring sprocket 155 engage the tree in the same plane as drive sprockets 131 to be driven as the tree is moved. An electronic counter switch 156 is mounted adjacent the teeth of sprocket 155 as will be explained. A delimber blade 160 is mounted on top of subhousing 150 to delimb the outer edge of the tree missed by the aft delimber unit 19 as will become more apparent.

The subassembly 72 is positioned by an upper traverse cylinder 170 behind bed 15 which is pinned to a pair of anchors 171 on the rear of the right side member 60 seen in FIG. 10. The piston rod 172 of cylidner 170 is pinned to a pair of driving ears 174 attached to the inside of housing 100. The subassembly 69 is positioned by a lower traverse cylinder 175 behind bed 15 below cylinder 170. The cylinder 175 is pinned to a pair of anchors 176 on the rear of the left side member 60 in FIG. 10 and its piston rod 178 is pinned to a pair of driving ears 179 on the inside edge of the housing 100 of the lower subassembly 69. Thus, when the piston rods 172 and 178 are retracted, the subassemblies 69 and 72 open away from each other and when the rods 172 and 178 extend, the subassemblies close toward each other as will become more apparent.

CUTTING ASSEMBLY

The cutting assembly 18 is movably mounted on the lower end of bed 15 as seen in FIGS. 2, 12 and 12a. The assembly 18 includes a carriage 180 having a U-shaped construction. Carriage 180 includes an elongate undercarriage 181 having upstanding posts 182 at opposite ends thereof. Posts 182 are arranged in registration with the open passage 184 in the lower ends of side members 60 as seen in FIG. 12a and extend up into the passage in the side members.

A positioning means 185 as best seen in FIG. 12 is provided between side members 60 for selectively varying the position of the cutting assembly 18 with respect to the bed 15. The positioning means 185 includes a primary fluid cylinder 190 which extends through the cutouts 75 and 81. The cylider 190 has a manifold base 191 which is pivoted in pillar blocks 192 on top of the upper crossarm 65 between side member 60. The piston rod 194 of cylinder 190 extending downwardly therefrom is rigidly coupled to the upwardly extending piston rod 195 of a secondary stump clear cylinder 196. The cylinder 196 is pinned to a pair of driving ears 198 attached to the undercarriage 181. A pair of trombone fluid connectors 200 connect cylinder 196 with the base 191 of cylinder 190. The connectors 200 each include a rigid base tube 201 fixed to base 191 and a rigid movable tube 202 slidably carried in the tube 201. The tubes 201 and 202 have a sliding seal therebetween. Thus, the primary cylinder 190 is used to position the carriage 180 and the secondary cylinder is used for raising the undercarriage to clear the stump of a felled tree as will become more apparent.

A housing 210 is mounted on the underside of carriage 180 as seen in FIGS. 2 and 12a with a top wall 211, back wall 212 and bottom wall 214 providing a forwardly facing open mouth 215 lying generally in the plane of bed 15. A pair of shear units 220 are pivoted at a central location within the housing 210. The units 220 can be pivoted forwardly out of housing 210 to shear a tree as they come together. Each unit 220 includes a support arm 221 which mounts a semi-circular shear blade 222. The arm 221 is pivoted at its inner end in housing 210. The pivot point of each unit 220 is so located that when the arms 221 are both pivoted fully in toward each other, the straight cutting edges 225 of the blades 222 are parallel and meet forwardly of and laterally aligned with the centerline CL-B of bed 15. Also the blades 222 move in a plane generally perpendicular to the centerline CL-B.

A fluid cylinder 230 as seen in FIG. 12a is provided for positioning each shear unit 220. Each cylinder 230 is pinned in a bracket 231 at the outwardly extending ends of housing 210 and its piston rod 232 is pinned to the arm 221 so that the line of forces $F_s$ from cylinder 230 passes through blade 222 in such a way as to minimize the reactive force on the support point of the unit 220. The line of force $F_s$ is best seen from the various positions illustrated for one of the shear units 220, it being understood that the other shear unit 220 operates similarly. The units 220 will be used with trees averaging ten-sixteen inches in diameter with an average size tree illustrated in FIG. 12a by dashed lines. The pivot axis $AX_s$ of the unit 220 seen in FIG. 12a is located a distance $d_s$ rearwardly of the centerline CL of the average tree. The pivot axis $AX_c$ of cylinder 230 is located a distance $d_c$ forwardly of axis $AX_s$ and a distance $d_f$ outwardly of axis $AX_s$, while the pivot axis $AX_r$ between the piston rod 232 and unit 220 is located a distance $d_r$ from axis $AX_s$. The distances $d_s$, $d_c$, $d_f$ and $d_r$ are selected so that the lines of force $F_s$ exerted on unit 220 by piston rod 232 pass through the boundary of an average size tree. Also, the larger the tree, the more nearly the lines of force $F_s$ pass through the center of the tree. Basically, this reduces the reaction force exerted on the unit 220 at pivot axis $AX_s$. Thus, not only is the wear on the shear unit 220 reduced but the force required to be exerted by cylinder 230 on unit 220 to shear a tree is minimized.

Referring to FIGS. 12b and 12c, the cutting characteristics of the shear units 222 are illustrated. FIGS. 12b and 12c are partial vertical sections through the cutting edge 225 of blade 222. The blade 222 has a thickness $T_B$ and the cutting edge 225 defines an angle $\phi$ between the angled surfaces 225, thereof. It has been found that using a thickness $T_B$ which is at least twice as great as that used in prior art shear blades actually reduces the force required to shear a standing tree. The prior art shear blade thicknesses are in the neighborhood of ½ inch whereas the thickness $T_B$ is 1–1½ inch. The angle $\phi$ is also greater than that associated with the prior art.

As seen in FIG. 12b, the blade 222 has just started to make a cut in the edge of a tree. At this time, the cutting edge 225 is cutting the wood fibers in the tree. As the blade 222 is continued to be forced into the tree, however, the surfaces 225, generate a separating force at the cut being made as seen in FIG. 12c. This causes the wood fibers just forward of the cutting edge 225 to be subjected to axial tension forces. This fiber tension is sufficient to greatly reduce the amount of force at cutting edge 225 to finish severing the fibers. Because less force is required to generate the fiber tension and sever the fibers under tension than required in a straight cutting operation, the overall force required to sever the tree is reduced significantly. This has been shown in tests where the force required to shear a tree using the assembly 16 is in the neighborhood of 21,000 psi per inch of cut whereas the force required by the prior art is in the neighborhood of 24,000–26,000 psi per inch of cut.

The fluid cylinders 230 are hydraulically connected to the bed 15 through a trombone connector 234 as seen in FIG. 12 mounted between the common crossarm 64 and the top of housing 210. The connector 234 includes a pair of extendable pipe subassemblies 235 with each subassembly 235 comprising a fixed rigid base pipe 236 and a movable rigid extension pipe 238 slidably received in one end of pipe 236. A sliding seal 239 on pipe 238 inside pipe 236 prevents leakage. The upper ends of the base pipes 236 are mounted in a top locator block 240 so that pipes 236 depend therefrom parallel to each other. The lower ends of extension pipes 238 are mounted in a bottom locator block 241 with pipes 238 extending upwardly therefrom parallel to each other and in registration with pipes 236. The block 240 is slipped into a pocket 242 in a bracket 244 on the back of the common crossarm 64 to restrain the block 240 against significant lateral movement while block 241 is slipped into pocket 245 on housing 210 to restrain block 241 against significant lateral movement. This can be done with connector 234 in a collapsed position and then manually extended. The hydraulic plumbing HP is then attached to subassemblies 235 so that pressure is always applied against the end of one of the extension pipes 238 in base pipes 236. This pressure causes the connector 234 to always try to extend to hold the blocks 240 and 241 in place even though the cutting assembly 18 is moved with respect to bed 15. The looseness of blocks 240 and 241 in pockets 242 and 244 allow the connector 234 to correct for slight lateral movement between bed 15 and cutting assembly 18 even though pipes 236 and 238 are rigid.

Prior to the time the fluid cylinders 230 of shear units 220 are actuated to shear a tree, the housing 210 is forced downwardly against the ground at the base of the tree. This forces the bed 15 upwardly to impose an upward force on the tree since it is fixed to the bed 15 by the traversing mechanism 16. Also this exerts an upward force on the front end of prime mover 11 through the carriage frame 14 and support frame 12. The upward force exerted on the tree imposes an axial tension in the wood fibers thereof generally uniformly over the entire cross-section of the tree trunk.

Prior to the time the piston rod 194 of the primary positioning cylinder 190 is extended to drive the housing 210 down against the ground, the piston rod 195 of the secondary stmp clear cylinder 196 is extended. After the primary cylinder 190 then drives housing 210 against the ground at the base of the tree and the tree is felled by shear units 220, the piston rod 195 of stump clear cylinder 196 is retracted while the piston rod 194 is not moved in primary cylinder 190. This serves to raise housing 210 away from the ground a short distance so that the bottom of housing 210 is above the level of the stump left after the tree is felled. The bed 15 can then be pivoted upwardly without housing 210 catching on the stump. After the bed 15 is pivoted upwardly with the tree thereon, the piston rod 195 of stump clear cylinder 196 is again extended without moving the piston rod 194 of primary cylinder 190 so that the shear blades 222 again lie in the plane of the original cut into the base of the tree. This insures accurate measurement of the lengths of the tree to be cut from the tree trunk during processing.

DELIMBER UNIT

The delimber unit 19 is mounted at the rear of machine 10 between the side beams 41 of carriage frame 14. This positions the delimber unit 19 in a spaced relationship to the bed 15 so that when a tree is carried by the bed 15 and pivoted to a horizontal position seen in FIG. 9, the tree trunk rests in the delimber unit 19. As the traversing mechanism 16 moves the tree forward lengthwise of itself, the delimber unit 19 removes the limbs from the tree.

The delimber unit 19 as best seen in FIGS. 1, 3, 4, and 13 includes generally a housing 250 mounted between the side beams 41 at the rear ends thereof, a pair of movable delimber blades 251 are carried in housing 250 along with a fixed delimber blade 252. The fixed delimber blade 252 is positioned below and supports the tree trunk while the movable blades 251 are moved into contact with the tree turnk so that as the traversing mechanism 16 moves the tree forward, the limbs will be sheared therefrom.

The housing 250 includes a front support plate 253, an intermediate support plate 254, and a rear support plate 255. The support plates 253, 254 and 255 are mounted in a longitudinally aligned and spaced apart arrangement with respect to the frame 14 and generally perpendicular to the longitudinal centerline CL-P of the prime mover 11 by a pair of upstanding side members 256 mounted on the rear ends of the side beams 41. Each of the plates 253, 254 and 255 have an upwardly opening semi-circular opening 258 therethrough with a diameter slightly larger than the maximum diameter tree to be processed. The fixed blade 252 is mounted on the back of rear plate 255 at the bottom of opening 258, one of the movable blades 251 is movably mounted between the rear plate 255 and the intermediate plate 254 on one side of openings 258, and the other movable blade 251 is movably mounted between front plate 253 and intermediate plate 254 on the opposite side of the openings 258.

Each blade 251 and 252 has a concave cutout 260 therein with a rearwardly facing cutting edge 261 along cutout 260. The radius of the cutouts 260 is such that the cutting edges 261 for a continuous circular shape when fully open as seen in FIG. 3. The blades 251 are mounted so that one point on their cutting edges 261 remains tangent to the tree as they are moved. A rearwardly opening shallow recess 262 is provided adjacent each cutting edge 261 as will become more apparent and forms a shoulder 264 spaced from cutting edge 261.

Each movable blade 251 is positioned by a fluid cylinder 265 pinned to one of the support plates with its piston rod 266 pinned to the blade 251. The cylinders 265 are connected to the hydraulic circuit through an accumulator as will be explained to allow the blades 251 to ride along the surface of the tree trunk during delimbing.

The cutting edge 261, recess 262 and shoulder 264 on blades 251 and 252 are arranged to engage the branches of the tree and cause them to separate upon the formation of a small cut at the base of the branch as illustrated in FIGS. 14–16. As the traversing mechanism 16 moves the tree lengthwise, a branch behind the delimber unit 19 approaches the cutting edge 261 on blades 251 and 252 as illustrated in FIG. 14 where the cutout 260 in blade 251 is riding along the periphery of the tree trunk. It will be noted that the branch is always angled rearwardly away from blade 251 since the branches grow upwardly and outwardly from the tree trunk so that the cutting edge 261 always engages the base of the branch first. Upon engagement of the base of the branch with cutting edge 261, a small cut is made as illustrated in FIG. 15. As the traversing mechanism 16 continues to drive the tree past the blade 251, that edge of the branch just outboard of the cut engages the back of recess 262 and shoulder 264 as seen in FIG. 16. Because of the grain discontinuity in the socket where the branch joins onto the tree trunk, the impact of the back of recess 262 and shoulder 264 causes the branch to first split longitudinally from the initial cut down to the socket and the branch to separate from the trunk within the socket to insure the removal of any protruberances from the tree trunk while at the same time requiring a minimum of power expended in the delimbing operation. It will also be noted that the delimber blade 160 on top of the upper traversing subassembly 72 operates in the same manner as blades 251 and 252.

TOPPER

The topper 20 is mounted between the side members 256 of the delimber housing 250 forwardly of the front plate 253 of delimber unit 19. The topper 20 includes a pair of shear doors 270 labelled 270-A and 270-B in FIG. 13 pivoted on shafts 271 on the insides of members 256 to pivot about generally vertical axes perpendicular to the axis $A_C$ and equally spaced laterally from axis $A_C$ so that the tree passes between doors 270 when they are open as shown by solid lines in FIG. 13 during the delimbing operation. When the diameter of the tree trunk reaches a certain minimum, the topper 20 is activated to pivot the doors 270 inwardly to the position shown by phantom lines in FIG. 13 to shear the top out of the tree. Each door 270 includes a shear blade 272 at the extending end thereof adapted to engage the periphery of the tree trunk as the doors 270 are pivoted inwardly and forwardly. The blades 271 are designed so that once they engage the tree trunk, they will be forced toward a closed position by the forward motion of the tree.

A drive link 275 is attached to the bottom end of shaft 271 of door 270-A below a guard beam 276 extending between the front ends of side members 256 immediately below doors 270. The link 275 extends inwardly and forwardly from shaft 271 when the doors 270 are open. A drive link 278 is attached to shaft 271 of door 270-B below beam 276 and extends rearwardly and outwardly therefrom when the doors 270 are open. A transfer link 279 is pinned between the ends of drive links 278 so that the doors 270 will both be simultaneously opened or closed as transfer link 279 is moved. A drive cylinder 280 is pinned to one of the side members 256 and its piston rod 281 is pinned to transfer link 279 adjacent the connection between links 279 and 275 so that as the piston rod 281 is extended, doors 270 will be closed and will be opened as rod 281 is retracted.

CAB

Figure 18:
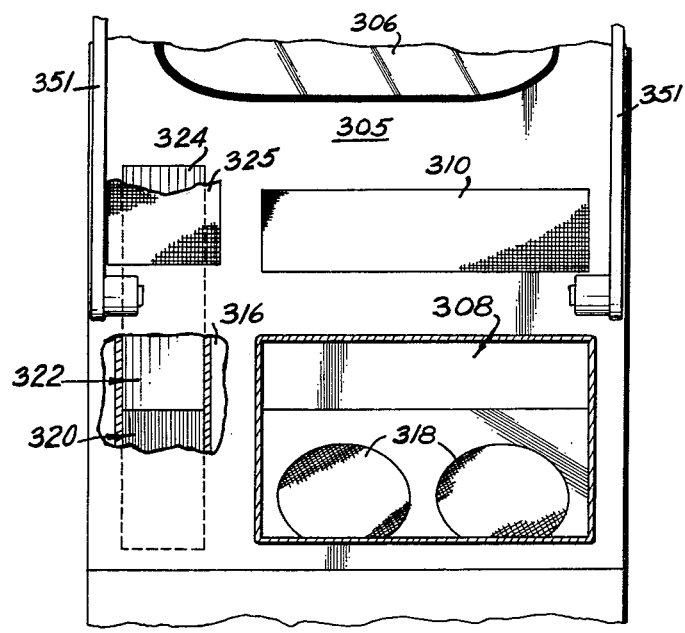
FIG. 18 is a partial rear view of the cab taken along line 18—18 in FIG. 17.
Figure 17:
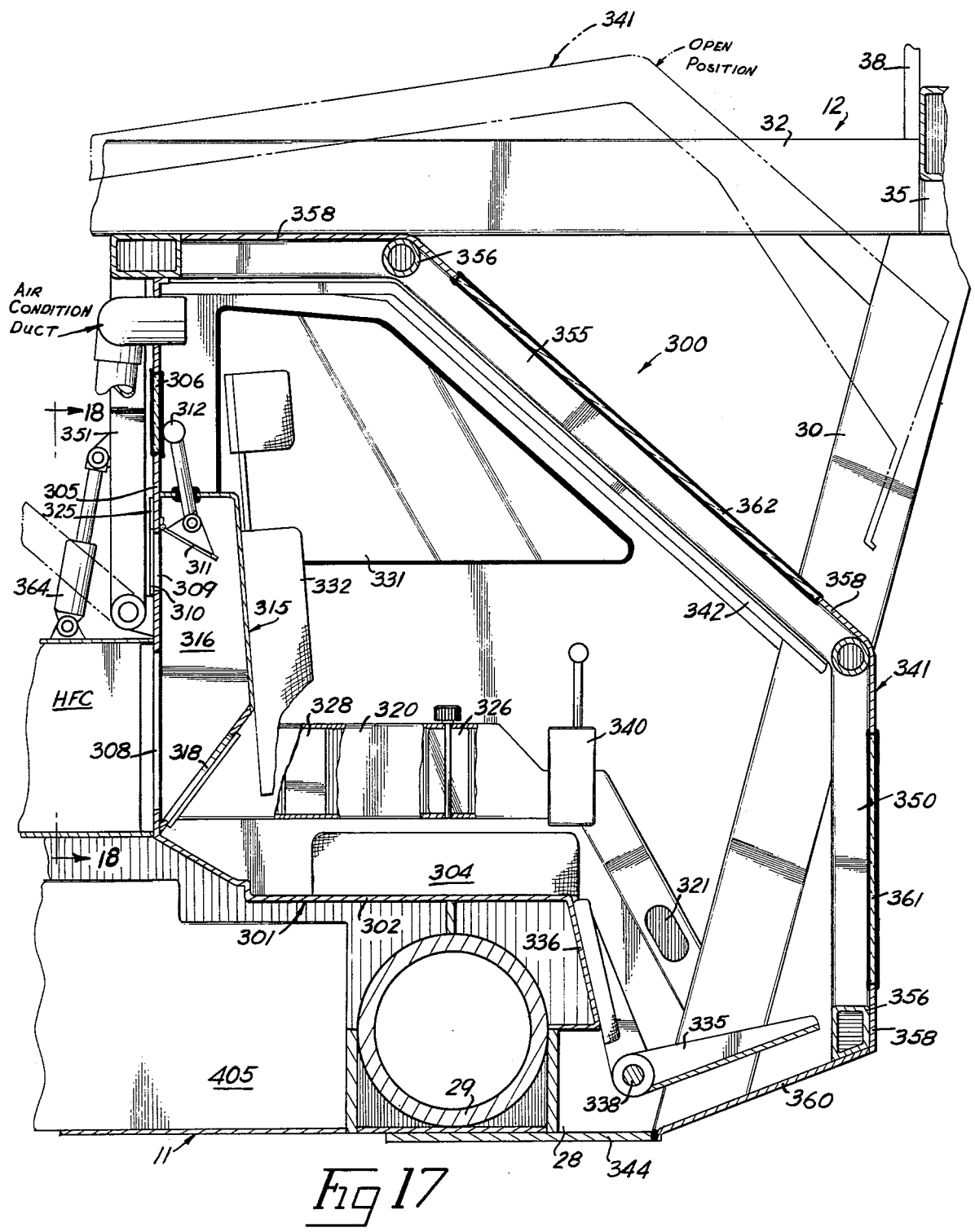
FIG. 17 is a longitudinal cross-sectional view of the cab.

A cab 300 is provided between the front ends of the side beams 28 of base 25 on prime mover 11 to house the operator in a forwardly facing direction. The cam frame 301 conforms generally in longitudinal cross-section to the shape of columns 39 and braces 40 in base support frame 12. The cab frame 301 as seen in FIGS. 17 and 18 includes a base plate 302 which extends over the top of the front torque tube 29 extending between side beams 28 onto which the seat bottom 304 is attached. A rear wall 305 extends between the columns 39 with a rear window 306 and an opening 308 at the bottom which communicates with the intake side of the hydraulic fluid cooler HFC above the hydraulic reservoir 405. An intake opening 309 is provided through wall 305 above the cooler HFC with a filter 310 and a door 311 to adjust the opening 309 with handle 312. A plenum 315 inside cab 300 defines a chamber 316 connecting openings 308 and 309 so that air drawn into the cooler HFC must come through opening 309 or the cab as will be explained. Ports 318 in the front bottom of plenum 315 connect chamber 316 with the inside of cab 300 so that the cooler HFC can withdraw air from the inside of cab 300 which is regulated by the amount door 311 has opened opening 309.

A duct 320 extends down one side of the inside of cab 300 with a discharge port 321 adjacent the driver's feet. The rear end of duct 320 communicates with a subchamber 322 in plenum 315 independent of chamber 316. An intake port 324 with filter 325 is provided through the back wall 305 of cab 300 so that outside air can be drawn therethrough. Thus, air drawn by cooler HFC from cab 300 through ports 318 causes feesh air to be drawn into the cab through intake port 324 and discharge port 321. A butterfly valve 326 is provided in duct 320 to control the airflow therethrough and a coil 328 is mounted in duct 320 to heat or cool the incoming fresh air.

The sides of the cab are closed by side walls 350 extending between the side beams 28, columns 39 and braces 40. Windows 331 are provided in walls 330. The seat back 332 is mounted on the front of plenum 315 with a headrest. A generally vertically adjustable foot rest 335 is mounted on the forwardly facing depending portion 336 of base plate 302. The foot rest 335 is pivoted in joint 338 so that it can be pivoted up against portion 336 to allow the operator to enter.

A single stick control unit 340 for the prime mover 11 is provided such as that disclosed in application Ser. No. 439,736 filed Feb. 5, 1974. An appropriate control panel (not shown) is provided to control the other machine functions.

The front and top of the cam 300 is open and is selectively closed by a door 341 engaging the top of the rear wall 302, flanges 342 on the inside of braces 40, and a connector plate 344 between the front end of side beams 28. The door 341 includes a frame 350 mounted on a pair of depending arms 351 at the rear top end thereof. The arms 351 are pivoted behind the wall 302 on the back of the lower ends of columns 39. The frame 350 conforms in shape to braces 40 and extends downwardly from the front ends of braces 40. Frame 350 includes side members 355 joined by cross beams 356 and covered by a skin 358. The lower end of door 341 has a bottom plate 360 that abuts plate 344 when closed. A lower windshield 361 is provided through the lower vertical front section of the door and an upper windshield 362 is provided in the upwardly inclined section of the door.

Openers 364 may be connected to the arms 351 to assist in opening the door 341. It will be noted that when the front of the door is raised to its open position shown in phantom lines in FIG. 17, the operator's vision is partially blocked insure that the door will be closed during operation of the machine.

HYDRAULIC CIRCUIT

Figure 19:
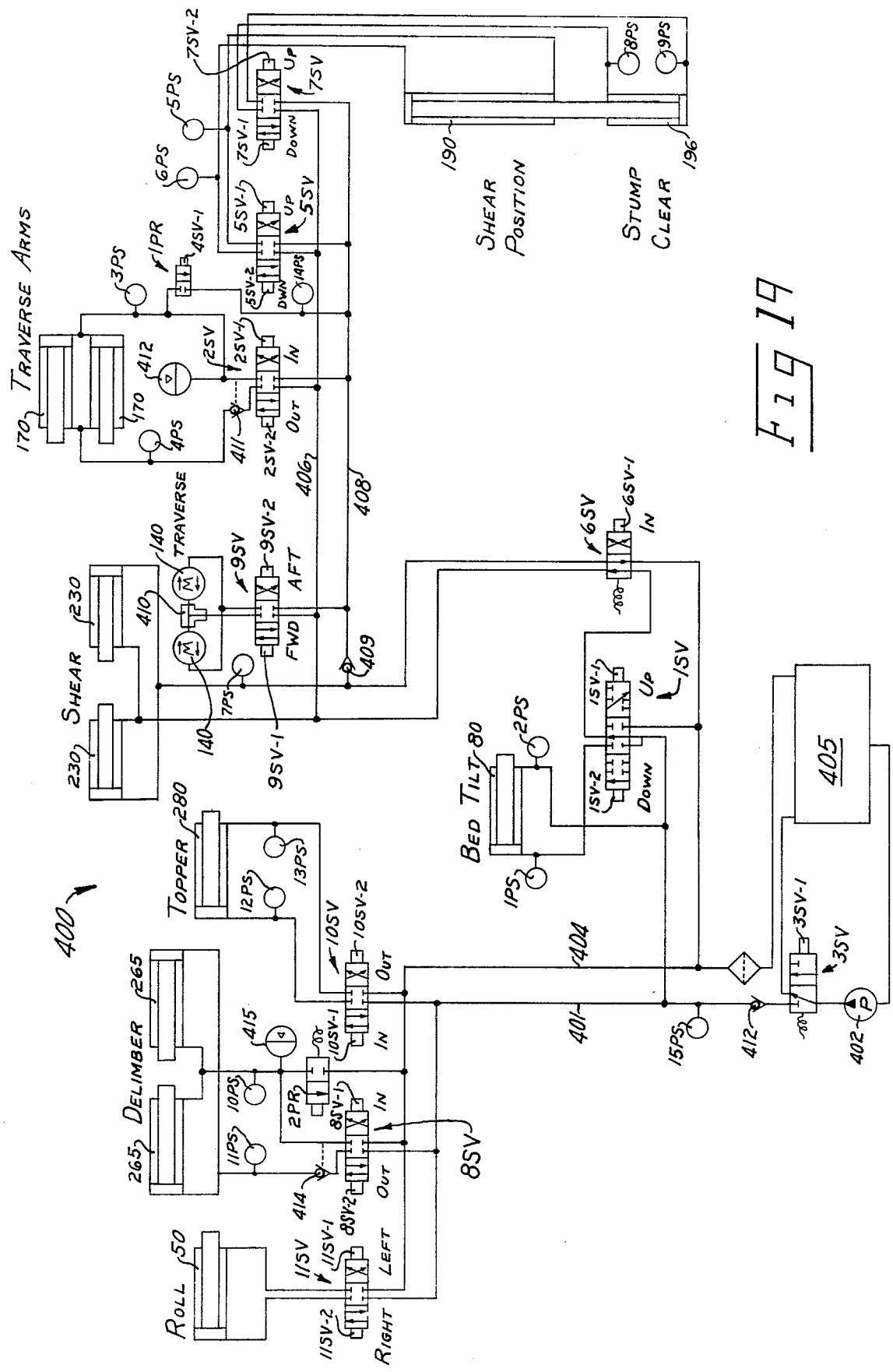
FIG. 19 is a hydraulic schematic diagram for the invention.
Figure 20A:
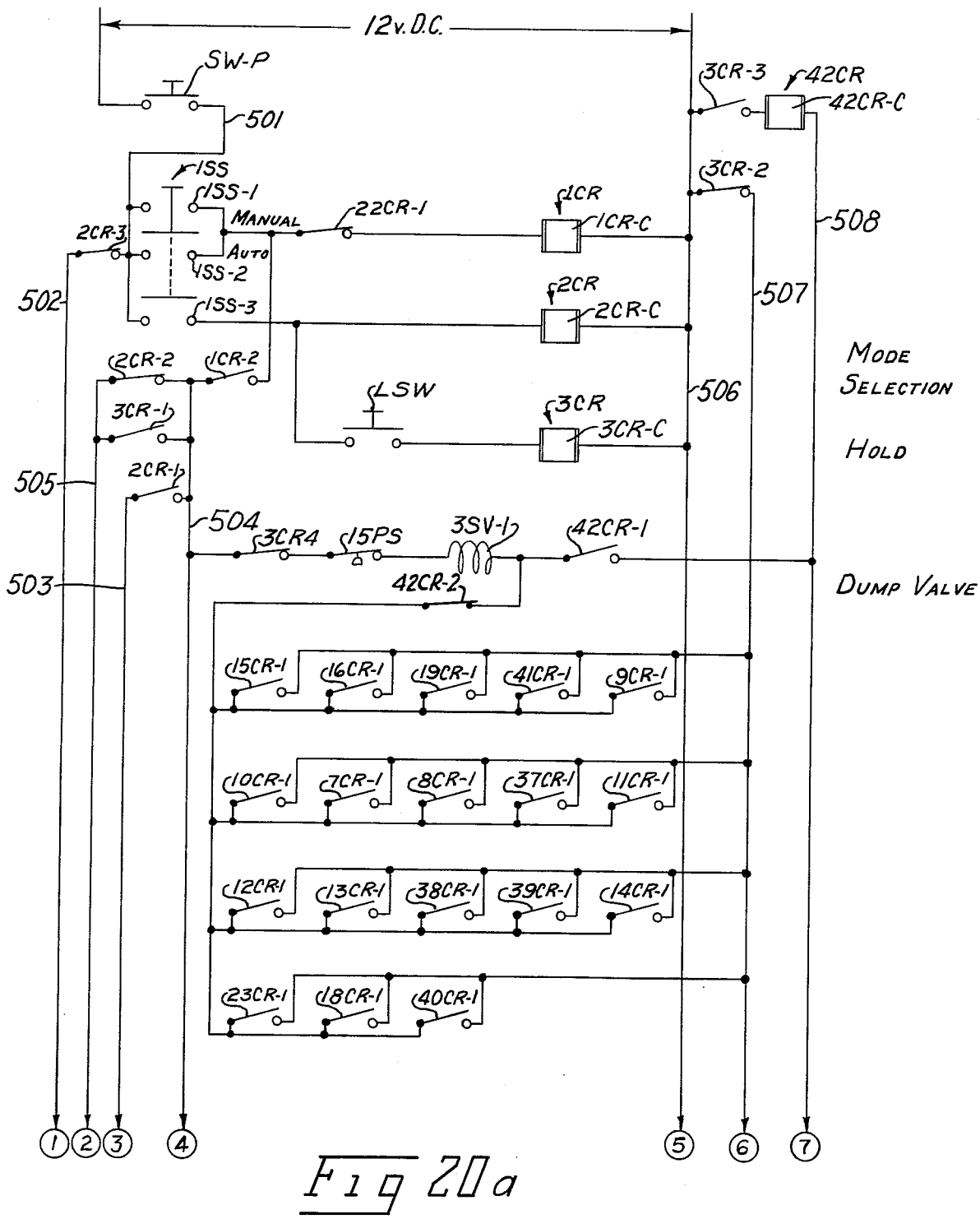
FIG. 20 is an electrical schematic diagram for the invention.
Figure 20B:
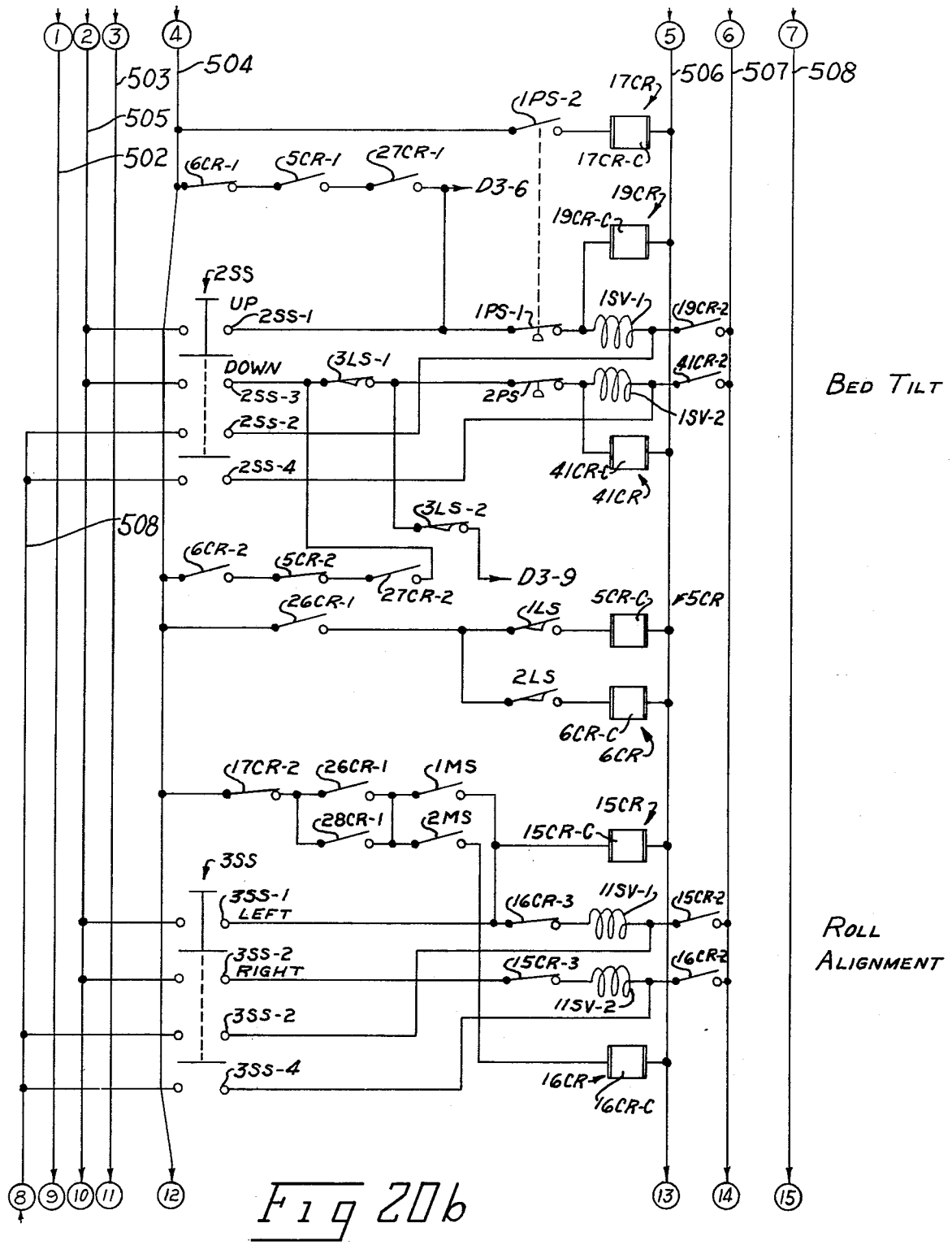
Figure 20C:
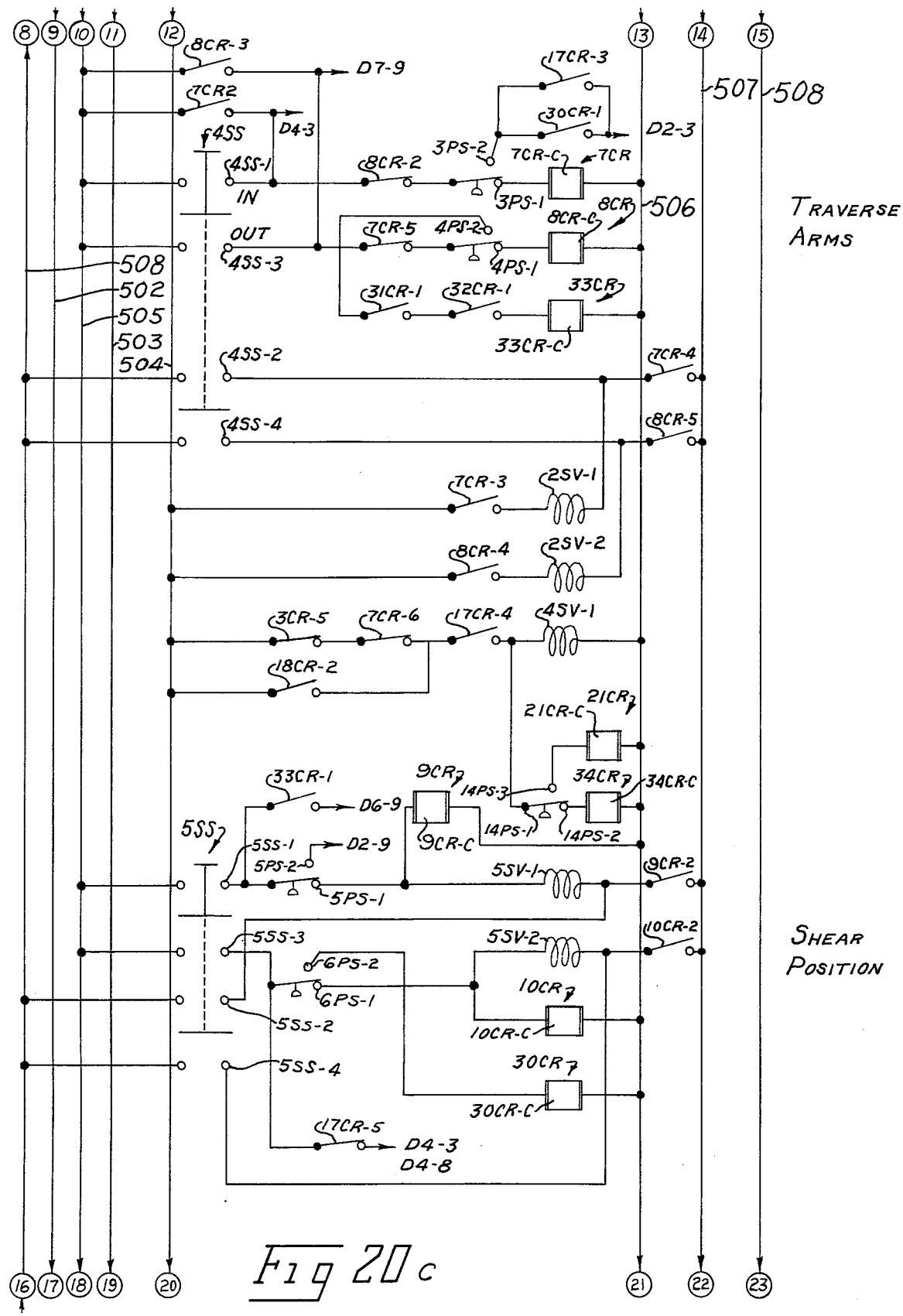
Figure 20D:
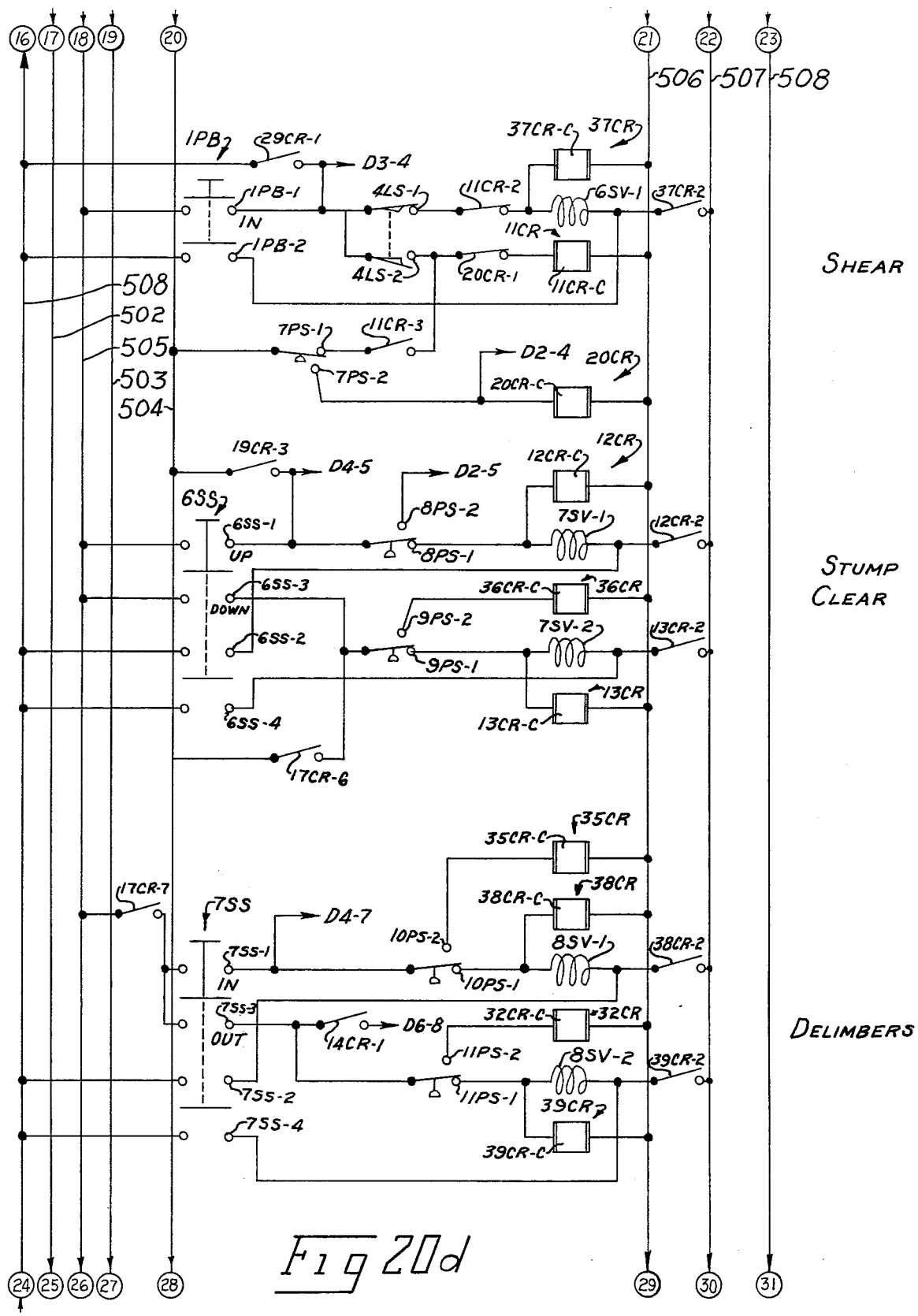
Figure 20E:
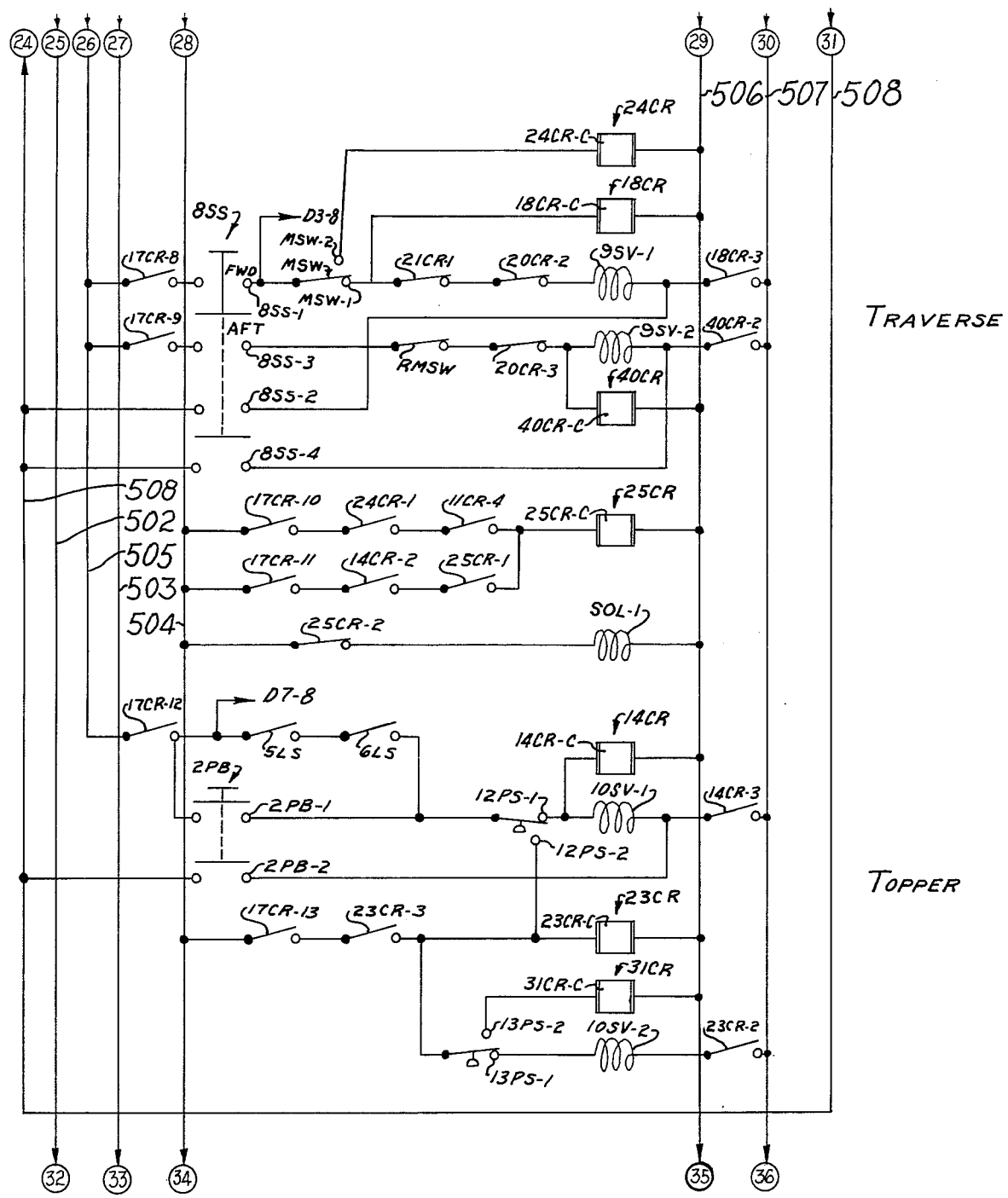
Figure 20F:
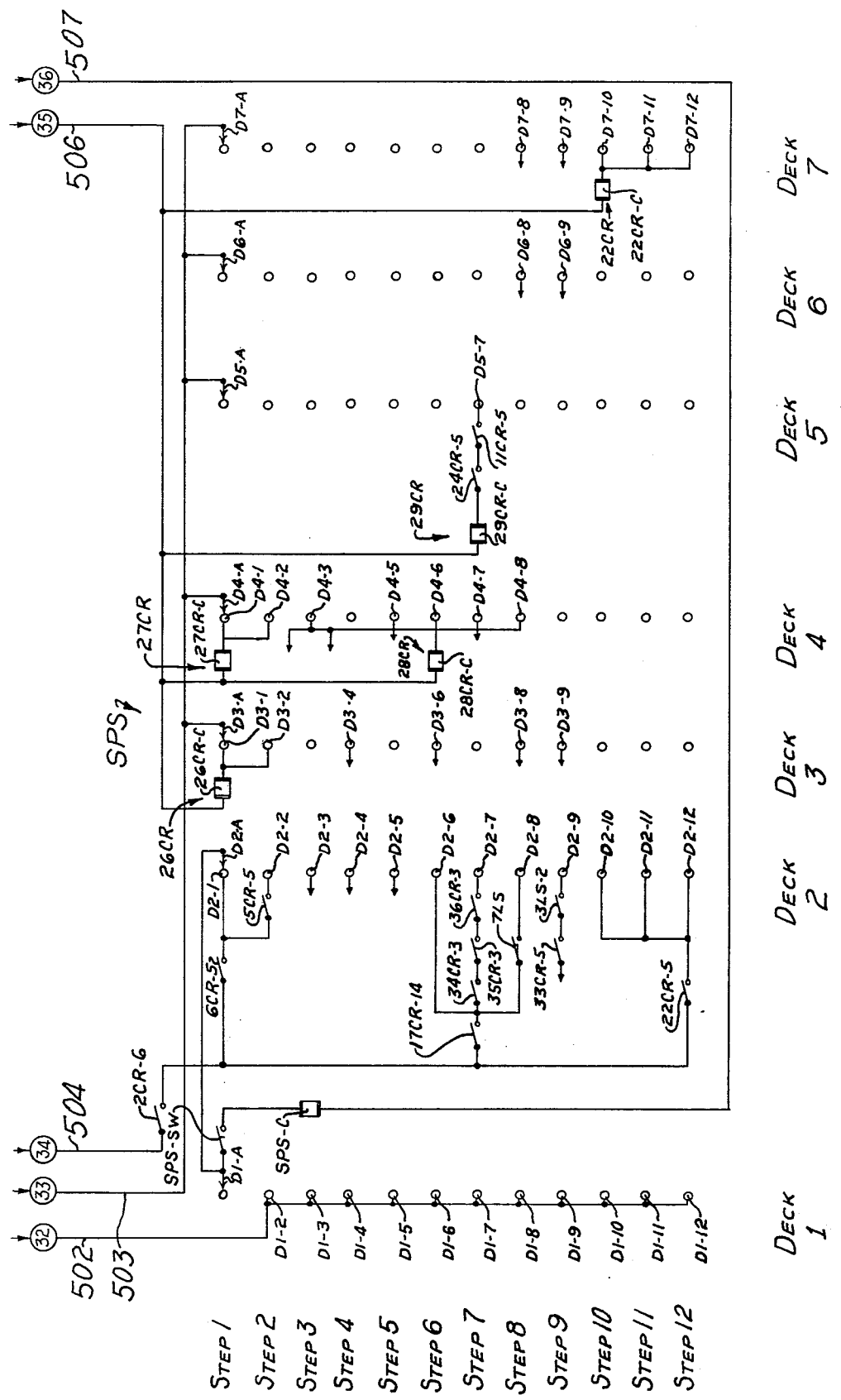

The hydraulic control circuit 400 is best seen in FIG. 19 and includes a primary pressure line 401 connected to a conventional hydraulic pump 402 through a dump valve 3SV. The circuit also includes a primary return line 404 connected to the hydraulic fluid reservoir 405 from which the pump 402 draws hydraulic fluid. The pump is driven from the engine in prime mover 11. The bed tilt cylinder 80 is controlled from the three position solenoid valve 1SV which is connected to the closed end of the bed tilt cylinder 80. The rod end of the bed tilt cylinder 80 is connected directly to the primary pressure line 401 so that the cylinder 80 extends regeneratively. The shear cylinders 230 are controlled by the two position solenoid valve 6SV serially connected with the valve 1SV so that the shear cylinders 230 can only be operated when the valve 1SV is in its neutral positon. A secondary pressure line 406 is connected to the normal high pressure side of valve 6SV and a secondary return line 408 is connected to the normal return side of the valve 6SV through a check valve 409 to prevent the return line 408 from being pressurized when valve 6SV is transferred. The hydraulic motors 140 of the traverse mechanism 16 are connected in parallel and controlled by the three position solenoid valve 9SV in combination with a flow divider 410. The traverse arm positioning cylinders 170 are controlled by a three-position solenoid valve 2SV that is cross-ported in its neutral position so that the rod end side of the cylinders 170 are connected to the secondary return line 408 through a pilot operated check valve 411 as will become more apparent. The closed end of the cylinders 170 are connected to an accumulator 412 and through a pressure regulator valve 1PR to the secondary return line 408. The primary shear position cylinder 190 is controlled from the three position solenoid valve 5SV and the stump clear cylinder 196 is controlled from the three position solenoid valve 7SV. It will be noted that the traverse motors 140, the traverse arm cylinders 170, the primary shear position cylinder 190 and the stump clear cylinder 196 can only be operated when the valve 6SV is in its neutral position as will become more apparent. It will also be noted that a check valve 414 is provided in the primary pressure line 401 at the dump valve 3SV to provide for the regenerative operation of the bed tilt cylinder 80 as will become more apparent. The roll positioning cylinder 50, the delimber cylinders 265 and the topper cylinder 280 are all connected between the primary pressure line 401 and primary return line 404. The roll cylinder 50 is controlled by the three position solenoid valve 11SV. The delimber cylinders 265 are controlled by three position solenoid valve 8SV which is cross-ported in its neutral position so that the closed end lines of the cylinders 265 are connected to the return line 404 through a pilot operated check valve 415. The rod end side of the cylinders 265 are also connected to an accumulator 416 and to the return line 404 through a pressure reduction valve 2PR. The topper control cylinder is controlled by three position solenoid valve 10SV.

ELECTRICAL CONTROL CIRCUIT

Referring to FIG. 20, it will be seen that the electrical control circuit 500 for the invention is connected to a 12 volt DC power source with a common hot wire and a common ground wire. The common hot wire from the power source is connected to the system hot wire 501 through power switch SW-P. The system hot wire 501 is connected to a secondary stepping hot wire 502 through normally closed contacts 2CR-3 of relay 2CR. The hot wire 501 is also connected to the stepping switch hot wire 503 through normally open contacts 2CR-1 of relay 2CR in series with normally open contacts 1CR-2 of relay 1CR in series with the manual contacts 1SS-1 and the automatic contacts 1SS-2 of the mode selector switch 1SS in parallel with each other. An operational hot wire 504 is connected to wire 501 through contacts 1CR-2 and contacts 1SS-1 and 1SS-2 in parallel with each other. A manual hot wire 505 is connected to the common point between contacts 2CR-1 and 1CR-2 through normally closed contacts 2CR-2 of relay 2CR. Normally open contacts 3CR-1 are connected in parallel across the contacts 2CR-2. The ground wire for the power supply is connected directly to the relay ground wire 506, is connected to a normal solenoid ground wire 507 through normally closed contact 3CR-2 of relay 3CR and is connected to the hold solenoid ground wire 508 through the normally open contact 3CR-3 of relay 3CR in series with the coil 42CR-C of relay 42CR. The coil 1CR-C of relay 1CR is connected between the relay ground wire 506 and the hot wire 501 in series with normally closed contacts 22CR-1 of relay 22CR and the contacts 1SS-1 and 1SS-2 in parallel with each other. The coil 2CR-C of the relay 2CR is connected between the relay ground wire 506 and the hot wire 501 through the secondary automatic contacts 1SS-3 of the mode selector switch 1SS.

The solenoid 3SV-1 of the dump valve 3SV has its ground side connected to the normal solenoid ground wire 507 through the normally open contacts 15CR-1 of relay 15CR, normally open contacts 16CR-1 of relay 16CR, normally open contacts 19CR-1 of relay 19CR, normally open contacts 41CR-1 of relay 41CR, normally open contacts 9CR-1 of relay 9CR, normally open contacts 10CR-1 of relay 10CR, normally open contacts 7CR-1 of relay 7CR, normally open contacts 8CR-1 of relay 8CR, normally open contacts 37CR-1 of relay 37CR, normally open contacts 11CR-1 of relay 11CR, normally open contacts 12CR-1 of relay 12CR, normally open contacts 13CR-1 of relay 13CR, normally open contacts 38CR-1 of relay 38CR, normally open contacts 39CR-1 of relay 39CR, normally open contacts 14CR-1 of relay 14CR, normally open contacts 23CR-1 of relay 23CR, normally open contacts 18CR-1 of relay 18CR, normally open contacts 40CR-1 of relay 40CR. The hot side of solenoid 3SV-1 is connected to the operational hot wire 504 through the normally closed pressure switch 15PS connected to the primary pressure line 401 of the hydraulic circuit 400 and the normally closed contacts 3CR-4 of relay 3CR. The ground side of solenoid 3SV-1 is also connected to the hold ground wire 508 through the normally open contacts 42CR-1 of relay 42CR.

The ground side of the "up" solenoid 1SV-1 of the bed tilt control valve 1SV is connected to the normal solenoid ground wire 507 through normally open contacts 19CR-2 of relay 19CR. The hot side of solenoid 1SV-1 is connected to the manual hot wire 505 through the normally closed contacts 1PS-1 of pressure switch 1PS in the down pressure side of the bed tilt cylinder 80 and the up contacts 2SS-1 of the bed tilt selector switch 2SS. The coil 19CR-C of relay 19CR is connected between the common point between contacts 1PS-1 and solenoid 1SV-1 and the relay ground wire 506. The common point between contacts 2SS-1 and contacts 1PS-1 is connected to the operational hot wire 504 through the normally open contacts 27CR-1 of relay 27CR in series with the normally open contacts 5CR-1 of relay 5CR in series with the normally closed contacts 6CR-1 of relay 6CR. The common point between contacts 1PS-1 and 2SS-1 is also connected to position D3-6 of stepping switch SPS. The coil 17CR-C of the relay 17CR is connected between the relay ground wire 506 and operational hot wire 504 through normally open contacts 1PS-2 of pressure switch 1PS. The ground side of solenoid 1SV-1 is also connected to hold ground wire 508 through up ground contacts 2SS-2 of switch 2SS. The ground side of the "down" solenoid 1SV-2 of valve 1SV is connected to the normal solenoid ground wire 507 through normally open contacts 41CR-2 of relay 41CR. The hot side of solenoid 1SV-2 is connected to the manual hot wire 505 through the normally closed contacts of pressure switch 2PS in the up pressure line of bed tilt cylinder 80 in series with the normally closed contacts of limit switch 3LS-1 located so that it is opened when the bed 15 is in the position shown by phantom lines in FIG. 1 in series with the down contacts 2SS-3 of selector switch 2SS. The common point between switch 3LS-1 and contact 2SS-3 is connected to the operational hot wire 504 through normally open contacts 27CR-2 of relay 27CR in series with the normally closed contacts 5CR-2 of relay 5CR in series with normally open contacts 6CR-2 of relay 6CR. The common point between switch 2PS and switch 3LS-1 is connected to position D3-9 of the step switch SPS through normally closed limit switch 3LS-2 located to be opened when bed 15 reaches the position seen in FIG. 5. It will also be noted that the ground side of solenoid 1SV-2 is connected to the hold ground wire 508 through the down ground contacts 2SS-4 of selector switch 2SS. The coil 5CR-C is connected between ground wire 506 and the operating hot wire 504 through the normally open contacts of limit switch 1LS in series with normally open contacts 26CR-1 of relay 26CR. The common point between switch 1LS and contacts 26CR-1 is connected to relay ground wire 506 through the normally open contacts of limit switch 2LS and coil 6CR-C of relay 6CR. Limit switch 1LS is closed when roller 85 on top of the bed 15 contacts a tree and limit switch 2LS is closed when roller 216 on housing 210 contacts the tree.

The ground side of the "left" solenoid 11SV-1 of roll control valve 11SV is connected to the normal solenoid ground wire 507 through normally open contacts 15CR-2 of relay 15CR. The hot side of solenoid 11SV-1 is connected to the manual hot wire 505 through the normally closed contacts 16CR-3 of relay 16CR in series with left contacts 3SS-1 of the bed roll selector switch 3SS. The coil 15CR-C of relay 15CR is connected between the relay ground wire 506 and the common point between contacts 6CR-3 and 3SS-1. The common point between contacts 16CR-3 and 3SS-1 is connected to the operational hot wire 504 through the left mercury switch 1MS in series with the normally open contact 26CR-1 of relay 26CR in series with the normally closed contacts 17CR-2 of relay 17CR. The normally open conttacts 28CR-1 of relay 28CR are connected in parallel across contacts 26CR-1. The ground side of solenoid 11SV-1 is connected to the hold ground wire 508 through the left ground contacts 3SS-2 of selector switch 3SS. The ground side of the "right" solenoid 11SV-2 is connected to the normal solenoid ground wire 507 through the normally open contacts 16CR-2 of relay 16CR. The hot side of solenoid 11SV-2 is connected to the manual hot wire 505 through the normally closed contacts 15CR-3 of relay 15CR in series with the right contacts 3SS-3 of selector switch 3SS. The coil 16CR-C of relay 16CR is connected between the relay ground wire 506 and the common point between contacts 15CR-3 and 3SS-3. The common point between contacts 15CR-3 and contacts 3SS-3 is also connected to the operational hot wire 504 through the normally open right mercury switch 2MS which is in turn connected to the common point between mercury switch 1MS and the contacts 26CR-1. The ground side of solenoid 11SV-2 is also connected to the hold ground wire 508 through the right round contacts 3SS-4 of switch 3SS. The mercury switches 1MS and 2MS are located on bed 15 so that the Centerline CL-B will be maintained vertical even though the terrain may not be horizontal as will become more apparent.

Coil 7CR-C of relay 7CR is connected between relay ground wire 506 and manual hot wire 505 through normally closed contacts 3PS-1 of the pressure switch 3PS on the in pressure side of cylinders 170 in series with normally closed contacts 8CR-2 of relay 8CR in series with the contacts 4SS-1 of the traverse arm selector switch 4SS. The normally open contact 3PS-2 of pressure switch 3PS is connected to position D2-3 of the stepping switch SPS through normally open contacts 30CR-1 of relay 30CR. The contacts 7CR-3 of relay 7CR are connected in parallel across contacts 30CR-1. The common point between the contacts 8CR-2 and 4SS-1 is connected to the manual hot wire 505 through normally open contacts 7CR-2 of relay 7CR. The common point between contacts 8CR-2 and 4SS-1 is also connected to both position D4-3 and position D4-8 of the stepping switch SPS. The ground side of the "in" solenoid 2SV-1 of the traverse arm control valve 2SV is connected to the normal solenoid ground wire 507 through normally open contacts 7CR-4 of relay 7CR. The hot side of solenoid 2SV-1 is connected to operational hot wire 504 through normally open contacts 7CR-3 of relay 7CR. The ground side of solenoid 2SV-1 is also connected to the hold ground wire 508 through the contact 4SS-2 of selector switch 4SS. The relay coil 8CR-C of relay 8CR is connected between the relay 8CR is connected between the relay ground wire 506 and the manual hot wire 505 through normally closed contacts 4PS-1 of pressure switch 4PS in the out pressure side of traverse cylinders 170 in series with normally closed contacts 7CR-5 of relay 7CR in series with the contacts 4SS-3 of selector switch 4SS. The normally open contacts 4PS-2 of pressure switch 4PS is connected to the relay ground wire 506 through normally open contacts 31CR-1 of relay 31CR in series with normally open contacts 32CR-1 of relay 32CR in series with the coil 33CR-C of relay 33CR. The common point between contacts 7CR-5 and 4SS-3 is connected to the manual hot wire 505 through normally open contacts 8CR-3. The common point between contacts 7CR-5 and 4SS-3 is also connected to the position D7-9 of stepping switch SPS. The ground side of the "out" solenoid 2SV-2 of valve 2SV is connected to the normal solenoid ground wire 507 through normally open contacts 8CR-5 of relay 8CR. The hot side of solenoid 2SV-2 is connected to the operational hot wire 504 through normally open contacts 8CR-4 of relay 8CR. The ground side of solenoid 2SV-2 is also connected to the hold ground wire 508 through contacts 4SS-4 of selector switch 4SS. The ground side of the solenoid 4SV-1 of pressure regulator 1PR and the traverse arm hydraulic circuit is connected to the relay ground wire 506 and the hot side thereof is connected to the operational hot wire 504 through the normally open contacts 17CR-4 of relay 17CR in series with normally closed contacts 7CR-6 of relay 7CR in series with normally closed contacts 3CR-5 of relay 3CR. The common point between contacts 7CR-4 and 7CR-6 is also connected to the operational hot wire 504 through normally open contacts 18CR-2 of relay 18CR. The common point between solenoid 4SV-1 and contact 17CR-4 is connected to the common contact 14PS-1 of the pressure switch 14PS in the low pressure side of the traverse arm cylinders 170. The normally closed contact 14PS-2 of pressure switch 14PS is connected to the common relay ground wire 506 through coil 34CR-C of relay 34CR. The normally open contact 14PS-3 of pressure switch 14PS is connected to the common relay ground wire 506 through the coil 21CR-C of relay 21CR.

The ground side of the "up" solenoid 5SV-1 of the shear position control valve 5SV is connected to the normal solenoid ground wire 507 through the normally open contacts 9CR-2 of relay 9CR. The hot side of solenoid 5SV-1 is connected to the manual hot wire 505 through normally closed contacts 5PS-1 of pressure switch 5PS in the down pressure side of the shear positioning cylinder 190 in series with the contacts 5SS-1 of the shear position selector switch 5SS. The normally open contact 5PS-2 of pressure switch 5PS is connected to point D2-9 of stepping switch SPS through contacts 33CR-1 and normally open contacts of limit switch 3LS-2. The common point between contact 5PS-1 and solenoid 5SV-1 is connected to the relay ground wire 506 through the coil 9CR-C of relay 9CR. The common point between contacts 5PS-1 and 5SS-1 is connected to position D6-9 of the stepping switch SPS through normally open contact 33CR-1 of relay 33CR. The ground side of solenoid 5SV-1 is also connected to the hold ground wire 508 through the contacts 5SS-2 of switch 5SS. The ground side of the "down" solenoid 5SV-2 of valve 5SV is connected to the normal solenoid ground wire 507 through normally open contacts 10CR-2 of relay 10CR and the hot side of solenoid 5SV-2 is connected to the manual hot wire 505 through normally closed contacts 6PS-1 of pressure switch 6PS in the up pressure side of shear position cylinder 190 in series with the contacts 5SS-3 of selector switch 5SS. The normally open contacts 6PS-2 of pressure switch 6PS is connected to the relay ground wire 506 through the coil 30CR-C of relay 30CR. The common point between the solenoid 5SV-2 and contacts 6PS-1 is connected to the relay ground wire 506 through coil 10CR-C of relay 10CR. The common point between contacts 6PS-1 and 5SS-3 is connected to position D4-3 of the stepping switch SPS through normally closed contacts 17CR-5 of relay 17CR. The ground side of solenoid 5SV-2 is also connected to the hold ground wire 508 through the contact 5SS-4 of selector switch 5SS.

The ground side of the "in" solenoid 6SV-1 of the shear control valve 6SV is connected to the normal solenoid ground wire 507 through normally open contacts 37CR-2 of relay 37CR and the hot side is connected to the manual hot wire 505 through normally closed contacts 11CR-2 of relay 11CR in series with the normally closed contacts 4LS-1 of limit switch 4LS located to be transferred when the shears are closed in series with the contact of pushbutton switch PB-1. The common point between solenoid 6SV-1 and contacts 11CR-2 is connected to relay ground wire 506 through coil 37CR-C of relay 37CR. The common point between the contacts of switch 1PB-1 and contacts 4LS-1 is connected to the operational hot wire 504 through normally open contacts 29CR-1 of relay 29CR. The common point between the contacts of switch 1PB-1 and contacts 4LS-1 is also connected to position D3-4 of the stepping switch SPS. The common point between contacts 4LS-1 and the contacts of switch 1PB-1 is also connected to the relay ground wire 506 through normally open contacts 4LS-2 of limit switch 4LS in series with normally closed contacts 20CR-1 of relay 20CR in series with the coil 11CR-C of relay 11CR. The common point between contacts 4LS-2 and contacts 20CR-1 is connected to the operational hot wire 504 through normally open contacts 11CR-3 in series with the normally closed contacts 7PS-1 of limit switch 7PS in the in pressure side of cylinders 230. The normally open contacts 7PS-2 of switch 7PS is connected to the position D2-4 of stepping switch SPS. The contact 7PS-2 is also connected to the relay coil 20CR-C of relay 20CR which is in turn connected to the common relay ground wire 506. The ground side of the solenoid 6SV-1 is also connected to the hold ground wire 508 through the contacts 1PB-2 of the shear switch 1PB.

The ground side of the "up" solenoid 7SV-1 of the stump clear valve 7SV is connected to the normal solenoid ground wire 507 through normally open contacts 12CR-2 of relay 12CR. The hot side of solenoid 7SV-1 is connected to the manual hot wire 505 through normally closed contacts 8PS-1 of pressure switch 8PS in the up pressure side of the stump clear cylinder 196 in series with the contacts 6SS-1 of the stump clear selector switch 6SS. Normally open contacts 19CR-3 of relay 19CR are connected in parallel across the contacts 6SS-1. The normally open contact 8PS-2 of pressure switch 8PS is connected to position D2-5 of the stepping switch SPS. The common point between the contacts 8PS-1 and 6SS-1 is connected to position D4-5 of the stepping switch SPS. The common point between solenoid 7SV-1 and contacts 8PS-1 is connected to the common relay ground wire 506 through the coil 12CR-C of relay 12CR. The ground side of solenoid 7SV-1 is also connected to the hold ground wire 508 through contacts 6SS-2. The ground side of the "down" solenoid 7SV-2 of the valve 7SV is connected to the normal solenoid ground wire 507 through normally open contacts 13CR-2 of relay 13CR. The hot side of solenoid 7SV-2 is connected to the manual hot wire 505 through normally closed contacts 9SP-1 of the pressure switch 9PS in the down pressure line of stump clear cylinder 196 in series with the contacts 6SS-3 of the switch 6SS. The common point between contacts 9PS-1 and 6SS-3 is connected to the operational hit wire 504 through normally open contacts 17CR-6 of relay 17CR. The normally open contact 9PS-2 is connected to the relay ground wire 506 through the coil 36CR-C of relay 36CR. The common point between solenoid 7SV-2 in contacts 9PS-1 is connected to the relay ground wire 506 through the coil 13CR-C of relay 13CR. The ground side of solenoid 7SV-2 is also connected to the hold ground wire 508 through contacts 6SS-4.

The ground side of the "in" solenois 8SV-1 of the delimber control valve 8SV is connected to the normal solenoid ground wire 507 through normally open contacts 38CR-2 of relay 38CR and the hot side is connected to the manual hot wire 505 through the normally closed contacts 10PS-1 of pressure switch 10PS in the in type pressure side of the delimber cylinders 265 in series with the contacts 7SS-1 of the delimber selector switch 7SS in series with the normally open contacts 17CR-7 of relay 17CR. The common point between contacts 10PS-1 and 7SS-1 is connected to position D407 of the stepping switch SPS. The normally open contacts 10PS-2 of the pressure switch 10PS is connected to the relay ground wire 506 through coil 35CR-C of relay 35CR. The common point between solenoid 8SV-1 and contacts 10PS-1 is connected to relay ground wire 506 through coil 38CR-C of relay 38CR. The ground side of solenoid 8SV-1 is also connected to the hold ground wire 508 through the contacts 7SS-2 of selector switch 7SS. The ground side of "out" solenoid 8SV-2 of valve 8SV is connected to the normal solenoid ground wire 507 through normally open contacts 39CR-2 of relay 39CR and the hot side is connected to the manual hot wire 505 through normally closed contact 11PS-1 of pressure switch 11PS in the out pressure line to cylinders 265 in series with the contacts 7SS-3 of selector switch 7SS and normally open contacts 17CR-7 of relay 17CR. The common point between contact 11PS-1 and 7SS-3 is connected to position D6-8 of the stepping switch SPS through normally open contacts 14CR-1 of relay 14CR. The normally open contact 11PS-2 of pressure switch 11PS is connected to the relay ground wire 506 through the coil 32CR-C of relay 32CR. The common point between solenoid 8SV-2 and contacts 11PS-1 is connected to the relay ground wire 506 through the coil 39CR-C of relay 39CR. The ground side of solenoid 8SV-2 is also connected to the hold ground wire 508 through the contact 7SS-4 of switch 7SS. The ground side of "forward" solenoid 9SV-1 of the traverse control valve 9SV is connected to the normal solenoid ground wire 507 through normally open contacts 18CR-3 of relay 18CR. The hot side of solenoid 9SV-1 is connected to the manual hot wire 505 through normally closed contact 20CR-2 of relay 20CR in series with normally closed contact 21CR-1 of relay 21CR in series with the normally closed contact MSW-1 of measuring switch MSW in series with the contact 8SS-1 of the traverse selector switch 8SS in series with the normally open contacts 17CR-8 of relay 17CR. The common point between contacts MSW-1 and 8SS-1 is connected to position D3-8 of the stepping switch SPS. The normally open contact MSW-2 of the measuring switch MSW is connected to the relay ground wire 506 through the coil 24CR-C of relay 24CR. The common point between contacts 21CR-1 and MSW-1 is connected to the common relay ground wire 506 through the coil 18CR-C of relay 18CR. The ground side of solenoid 9SV-1 is also connected to the hold ground wire 508 through the contacts 8SS-2 of selector switch 8SS. The ground side of the "aft" solenoid 9SV-2 of valve 9SV is connected to the normal solenoid ground wire 507 through normally open contacts 40CR-2 and the hot side is connected to the manual hot wire 505 through the normally closed contacts 20CR-3 of relay 20CR in series with the normally closed contacts of the reverse measuring switch RMSW in series with the contacts 8SS-3 of selector switch 8SS in series with normally open contact 17CR-9 of relay 17CR. The common point between contacts 20CR-3 and solenoid 9SV-2 is connected to relay ground wire 506 through coil 40CR-C of relay 40CR. The ground side of solenoid 9SV-2 is also connected to the hold ground wire 508 through the contacts 8SS-4 of the switch 8SS. The coil 25CR-C of relay 25CR is connected between the relay ground wire 506 and the operational hot wire 504 through open contacts 11CR-4 of relay 11CR in series with normally open contacts 24CR-1 of relay 24CR in series with normally open contacts 17CR-10 of relay 17CR. The common point between coil 25CR-C and contact 11CR-4 is also connected to the operational hot wire 504 through normally open contacts 25CR-1 of relay 25CR in series with normally open contacts 14CR-2 of relay 14CR in series with normally open contact 17CR-11 of relay 17CR. The resetting solenoid SOL-1 of the measuring switch MSW is connected between the relay ground wire 506 and operational hot wire 504 through normally closed contacts 25CR-2 of relay 25CR.

It will be noted that the measuring unit 154 carried on the traversing subassembly 72 includes both switch MSW and switch RMSW together with the solenoid SOL-1. The measuring unit is pre-set so that the switch MSW transfers upon passage of a prescribed length of tree pass the cutting assembly 18. The reverse measuring switch RMSW allows the tree to be moved aft in the machine for approximately two feet without losing the measuring capability of the unit 154. The slenoid SOL-1 reset the measuring unit 154 so that after the length of tree projecting pass the cutting assembly 18 has been separated from the tree proper, the measuring unit 154 is ready to recycle.

The ground side of the "in" solenoid 10SV-1 of the topper control valve 10SV is connected to the normal solenoid ground wire 507 through normally open contacts 14CR-3 of relay 14CR and the hot side is connected to the manual hot wire 505 through normally closed contacts 12PS-1 of pressure switch 12PS in the in pressure line of cylinder 280 in series with the contact 2PB-1 of the topper control pushbutton switch 2PB in series with the normally open contact 17CR-12 of relay 17CR. The normally open limit switches 5LS and 6LS located on the traversing subassemblies 69 and 72 respectively are connected in parallel across the contacts 2PB-1 so that when the tree passing through the traversing mechanism 16 reaches a certain predetermined minimum diameter, the switches 5LS and 6LS will close. The common point between the contacts 12PS-1 and 2PB-1 is also connected to position D7-8 on the stepping switch SPS through th switches 5LS and 6LS. The normally open contact 12PS-2 of pressure switch 12PS is connected to the relay ground wire 506 through coil 23CR-C of relay 23CR. The common point between coil 23CR-C and contact 12PS-2 is connected to the operational ground wire 504 through normally open contacts 23CR-3 of relay 23CR in series with normally open contacts 17CR-13 of relay 17CR. The common point between coil 23CR-C and contact 23CR-3 is connected to the hot side of the "out" solenoid 10SV-2 of valve 10SV through the normally closed contacts 13PS-1 of pressure switch 13PS located in the out pressure line of the cylinder 280. The normally open contact 13PS-2 of pressure switch 13PS is connected to the relay ground wire 506 through coil 31CR-C of relay 31CR. The ground side of the solenoid 10SV2 is connected to both the normal solenoid ground wire 507 and the hold solenoid ground wire 508 through the normally open contacts 23CR-2.

During automatic operation of the machine as will become more apparent, the cycle may be stopped at any position by closing the contacts of the cycle hold switch LSW to energize the coil 3CR-C of relay 3CR. The switch LSW and coil 3CR-C are connected in series between the relay ground wire 506 and the system hot wire 501 through the secondary automatic contacts 1SS-3. The operation of the switch LSW will become more apparent.

The automatic operation of the machine is controlled by conventional stepping switch SPS. The stepping switch SPS has seven decks, each having 12 positions and a wiper arm which moves between each of the twelve positions as the switch is cycled. The switch has a stepping coil SPS-C with a built-in switch SPS-SW that causes the coil to step the wiper arms one step at a time each time the coil is energized. The decks are numbered D1-D7 with the wiper arm of each deck distinguished by the deck number followed by the letter A. The contact at each of the twelve positions of each deck is distinguished by the deck number followed by the contact position number. For instance, the contact at the second positon on deck 2 would be labelled D2-2.

Contacts D1-2 through D1-12 of deck 1 are connected to the stepping hot wire 502. The wiper arm D1-A is connected to the hot side of stepping coil SPS-C is connected to the normal solenoid ground wire 507. The common point between arm D1-A and the stepping switch SPS-SW is connected to the arm D2-A of Deck 2 of the switch.

The contact D2-1 is connected to the normal hot wire 504 through the normally open contacts 6CR-5 in series with the normally open contacts 2CR-6. Contact D2-2 is connected to the operational hot wire 504 through the normally open contacts 5CR-5 of relay 5CR in series with the normally open contacts 6CR-5 and the normally open contacts 2CR-6. The contact D2-3 is connected in the traverse arm control circuit as previously indicated. The contact D2-4 is connected to the shear control circuit as previously indicated. The contact D2-5 is connected to the stump clear control circuit as previously indicated. The contact D2-6 is connected to the operational hot wire 504 through the normally open contacts 17CR-14 of relay 17CR in series with the normally open contacts 2CR-6. The contact D2-7 is connected to the operational hot wire 504 through the normally closed contacts 36CR-3 of the relay 36CR in series with the normally open contacts 35CR-3 of relay 35CR in series with the normally open contacts 34CR-3 of relay 34CR in series with the normally open contacts 17CR-14 in series with the normally open contacts 2CR-6. Contact D2-8 is connected to the operational hot wire 504 through the normally open limit switch 7LS located so that it is closed when the traversing mechanism 16 has fully closed in series with the normally open contacts 17CR-14 and the normally open contacts 2CR-6. Contact D2-9 is connected to the shear position circuit through the normally open contacts of limit switch 3LS-2 and normally open contacts 33CR-5 of relay 33CR in series as already indicated. Contacts D2-10 through D2-12 are connected in parallel with each other and in series with the normally open contacts 22CR-5 of relay 22CR and the normally open contacts 2CR-6 to the operational hot wire 504.

The arm D3-A of deck 3 is connected to the automatic hot wire 503. Contacts D3-1 and D3-2 are connected in parallel with each other through the coil 26CR-C of relay 26CR to the relay ground wire 506. Contact D3-4 is connected to the position shown in the shear control circuit and contact D3-6 is connected to the position shown in the bed tilt control circuit. The contact D3-8 is connected to the position shown in the traverse control circuit and D3-9 is connected to the position shown in the bed tilt control circuit.

The wiper arm D4-A of deck 4 of the switch is connected to the automatic hot wire 503. Contacts D4-1 and D4-2 in parallel with each other are connected to the relay ground wire 506 through the relay coil 27CR-C of relay 27CR. Contact D4-3 is connected in parallel with contact D4-8 to the positions indicated in the traverse arm control circuit and the shear position control circuit. Contact D4-5 is connected to the position shown in the stump clear control circuit. Contact D4-6 is connected through the coil 28CR-C of relay 28CR to the relay ground wire 506. Contact D4-7 is connected to the position shown in the delimber control circuit.

The arm D5-A of deck 5 is connected to the hot wire 503. Contact D5-8 is connected to relay ground wire 506 through normally closed contacts 11CR-5 of relay 11CR in series with normally open contacts 24CR-5 of relay 24CR in series with the coil 29CR-C of relay 29CR.

The arm D6-A of deck 6 is connected to the hot wire 503. The contact D6-8 is connected to the point indicated in the delimber control circuit. The contact D6-9 is connected to the point indicated in the shear position control circuit.

The arm D7-A of deck 7 is connected to hot wire 503. Contact D7-8 is connected to the point indicated in the topper control circuit. Contact D7-9 is connected to the point indicated in the traverse arm control circuit. Contacts D7-10, D7-11 and D7-12 in parallel with each other connect with relay ground wire 506 through coil 22CR-C of relay 22CR.

OPERATION

In operation, it will be seen that the operator drives the machine 10 using the single stick control unit 340. Normally, the machine will be operated in its automatic mode so that this mode will be described in detail. The operator closes the power switch SW-P to supply power to the control circuit 500 and would then normally transfer switch 1SS to the automatic mode closing contacts 1SS-2 and 1SS-3. This energizes relays 1CR and 2CR to remove power from the stepping hot wire 502. This also supplies power to the operational hot wire 504 and stepping switch hot wire 503. The machine is now armed and the bed 15 is in the position shown in FIG. 5 with the cutting assembly 18 raised and the traversing mechanism 16 opened. It will also be noted that the delimber unit 19 and the topper 20 are also open.

In this position, the stepping switch SPS energizes the roll alignment enable relay 26CR and the bed alignment enable relay 27CR. If the machine is sitting on an unlevel ground, the mercury switch 1MS or 2MS will be closed to energize the appropriate solenoid 11SV-1 or 11SV-2 to cause the cylinder 50 to adjust the position of the carriage frame 14 until the centerline CL-B of the bed 15 is plumb vertically whereupon both switches 1MS and 2MS are opened. The limit switches 1LS and 2LS are now armed since contacts 26CR-2 are now closed. As soon as the bottom roller 216 contacts the tree, relay 6CR is energized to cause the bed 15 to be driven down by energizing solenoid 1SV-2 to cause the piston rod of bed tilt cylinder 80 to extend through the now closed contacts 27CR-2. This also causes the switch SPS to step to position 2.

As the machine continues to be driven toward the tree, the bed is tilted down until the top roller 85 on the frame 15 engages the tree to energize relay 5CR and open contacts 5CR-2 to de-energize solenoid 1SV-2. The tree is now against the top roller 85 and the bottom roller 216 on the bed 15 and ready to be engaged. When relay 5CR is energized, contacts 5CR-5 on deck 2 of the stepping switch are closed to cause the stepping switch SPS to step to position 3.

This causes relays 7CR and 10CR to be energized so that the in solenoid 2SV-1 of the traverse arm circuit causes the subassemblies 69 and 72 to close and also energizes the down solenoid 5SV-2 in the shear position circuit to extend the cutting assembly 18 downwardly against the ground. As soon as the subassemblies 69 and 72 are pivoted fully in against the tree until the sprocket thereon engages and tightly grips it against the bed, pressure switch 3PS is transferred. As soon as the cutting assembly 18 is driven down against the ground, the pressure switch 6PS is transferred to energize relay 30CR. This closes the contacts 30CR-1 in the traverse arm circuit to cause the stepping switch SPS to step to position 4. It will be noted that the stump clear cylinder 196 is already extended since its extended position is its normal position.

This energizes the in solenoid 6SV-1 of the valve 6SV to cause the cutting assembly 18 to close to shear the tree off at its base. As soon as the limit switch 4LS is transferred, relay 11CR is energized and solenoid 6SV-1 de-energized to allow the cutting assembly 18 to open. When cutting assembly 18 is fully opened, the pressure switch 7PS is transferred to energize the relay 20CR and cause the switch SPS to step to position 5. This causes the relay 20CR to then be de-energized.

In position 5, the up solenoid 7SV-1 is energized to cause the stump clear cylinder 196 to raise the cutting assembly 18 sufficiently to clear the tree strump whereupon pressure switch 8PS is transfered to cause the stepping switch SPS to step to position 6. This energizes the up solenoid 1SV-1 to cause the bed tilt cylinder 80 to retract and pivot the bed to its upper horizontal position shown in FIG. 8 whereupon the pressure switch 1PS is transferred to close contacts 1PS-2 and energize relay 17CR. When relay 17CR is energized, the down solenoid 7SV-2 of the stump clear circuit is energized to extend the cutting assembly 18 back to its initial position so that the measurement of the tree will be accurate. When the stump clear cylinder 196 is again extended, pressure switch 9PS is transferred to energize relay 36CR. The closing of contacts 17CR-14 causes the stepping switch SPS to step to position 7. This energizes the in solenoid 8SV-1 in the delimber circuit to drive the delimber blades 251 in the delimber unit 19 in against the tree until pressure switch 10PS is transferred. This causes the relay 35CR to be energized. It will also be noted that when the relay 17CR is energized, the solenoid 4SV-1 in the pressure regulator 1PR is energized to shift the traverse arm cylinders 170 from the high pressure to a lower pressure for use during traversing of the trees. The pressure switch 14PS was transferred on the high pressure supplied to the cylinders 170 when the traverse arms were clamping the tree for the felling operation but is now transferred back to its initial position to energize relay 34CR. When the contacts 36CR-3 are closed to indicate that the stump clear cylinder 196 is down, the contacts 35CR-3 close to indicate that the delimber blades 51 are in and the contacts 34CR-3 close to indicate that the traverse arm pressure regulator 1PR is operating, the stepping switch SPS steps to position 8.

The forward solenoid 9SV-1 in the traverse control circuit is energized to cause the hydraulic motors 140 to propel the tree forwardly in the machine as seen in FIG. 9 where the delimber blades 251 and 242 in combination with the delimber blade on the traverse subassembly 72 delimb the tree. When the prescribed length of tree has passed the cutting assembly 18, the switch MSW transfers to de-energize the solenoid 9SV-1 and energize relay 24CR. This causes the relay 29CR to be energized to energize the solenoid 6SV-1 to close the cutting assembly 18 and cut the tree at the prescribed length. After the cutting assembly has cut the tree and the cutting assembly opened to energize relay 20CR, the solenoid 9SV-1 is re-energized to drive the tree forwardly again. This operation is continued until the limit switches 5LS and 6LS on the topper control are closed to indicate that a 3 inch diameter is at the delimber unit 19 whereupon the in solenoid 10SV-1 of the topper control circuit is energized to close the topper 20 and cut the top out of the tree. When the solenoid 10SV-1 is energized, the relay 14CR is also energized to cause the out solenoid 8SV-2 in the delimber control circuit to be energized to drive the movable delimber blades 51 out to clear the tree. As soon as the topper is fully closed, the limit switch 12PS is closed to energize relay 23CR and the solenoid 10SV-2 to open the topper. This causes the topper to kick the top of the tree back of the delimber unit 19 as it opens until pressure switch 13PS is transferred to energize relay 31CR. The shut-down limit switch 7LS is closed when the end of the tree passes through the traversing mechanism 16 to cause the stepping switch SPS to step to position 9.

This stops the traversing motors 140 and energizes the out solenoid 2SV-2 of the traverse arm control to open the traversing mechanism 16 until pressure switch 4PS is transferred when the traversing mechanism 16 is fully opened. This energizes relay 33CR to cause the up solenoid 5SV-1 of the shear position circuit to energize to cause the shear position cylinder 190 to raise the cutting assembly 18. At the same time, the down solenoid 1SV-2 of the belt tilt control circuit has been energized to pivot the bed down until the limit switch 3LS-2 is opened to leave the bed 15 in the position shown in FIG. 5. As soon as the bed 15 is to its down position, the cutting assembly 18 raised, and the traversing mechanism 16 is fully opened, the stepping switch SPS steps to position 10 whereupon relay 22CR is energized to close contacts 22CR-5. This de-energizes relay 1CR and causes the stepping switch SPS to step through positions 10, 11 and 12 back to its initial position ready for additional operation.

If the operator sees that something is wrong during the automatic operation, he simply depresses the hold switch LSW to energize relay 3CR. This closes contacts 3CR-1 to supply power to the manual hot wire 505 to enable all of the manual operation switches 2SS, 3SS, 4SS, 5SS, 1PB, 6SS, 7SS, 8SS and 2PB of the control circuit 500 while at the same time opening contacts 3CR-2 to disconnect the normal solenoid ground wire 507 from the system ground so that all of the solenoids are de-energized even though the relays remain energized. This closes contacts 3CR-3 to connect the hold ground wire 508 to the ground side of the power supply so that when one of the manual switches is closed, the solenoids associated therewith and only the solenoids associated therewith will be energized to manually adjust the machine. Each time one of the solenoids in the circuit is energized, the relay 42CR is energized to close contacts 42CR-1 to energize the dump valve 3SV and pressurize the system while at the same time opening normally closed contacts 42CR-2 to isolate ground wire 507. It will also be noted that the selector switch 1SS may be transferred to its manual position to allow the switches to be operated manually.

Figure 22:
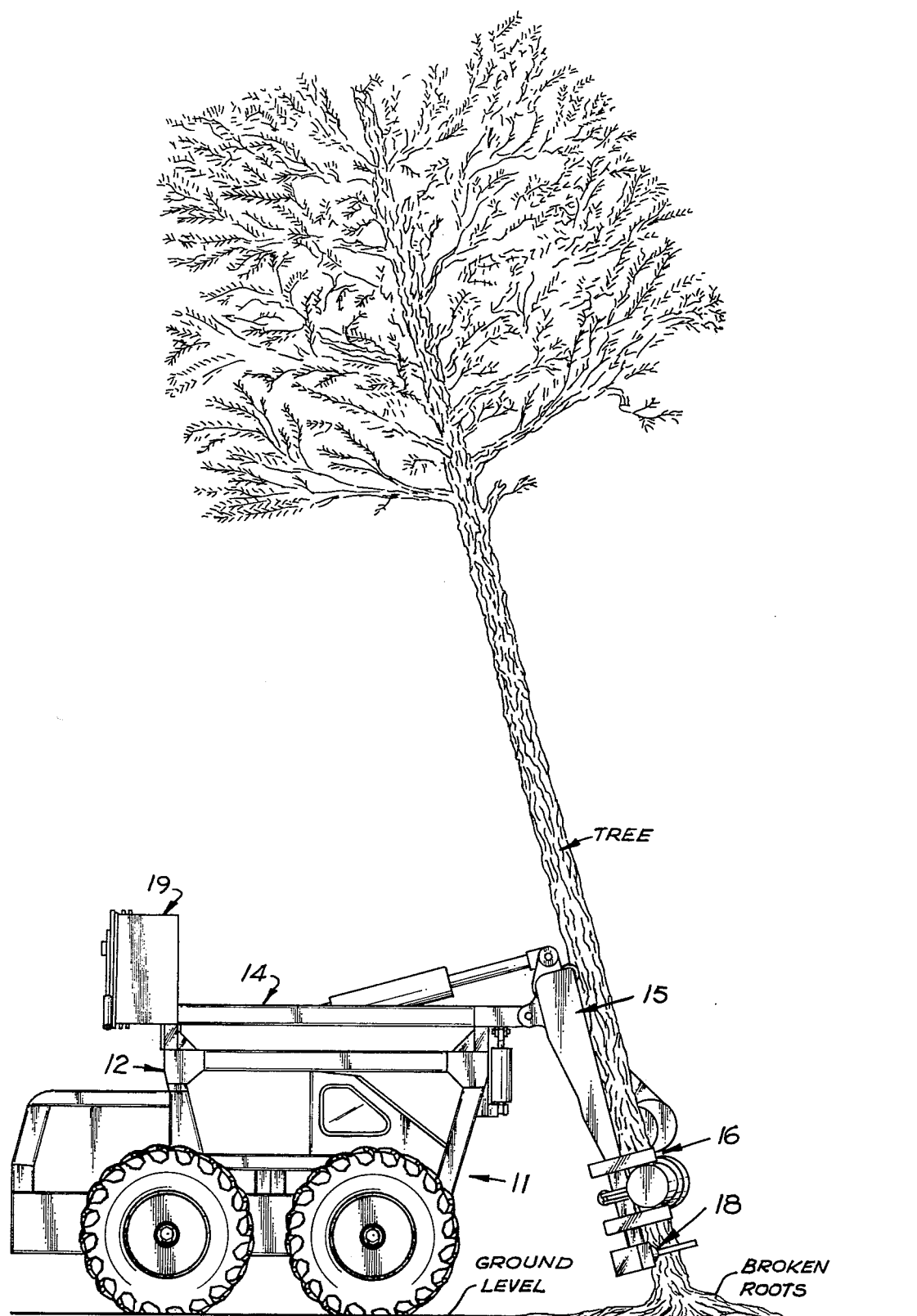
Figure 23:
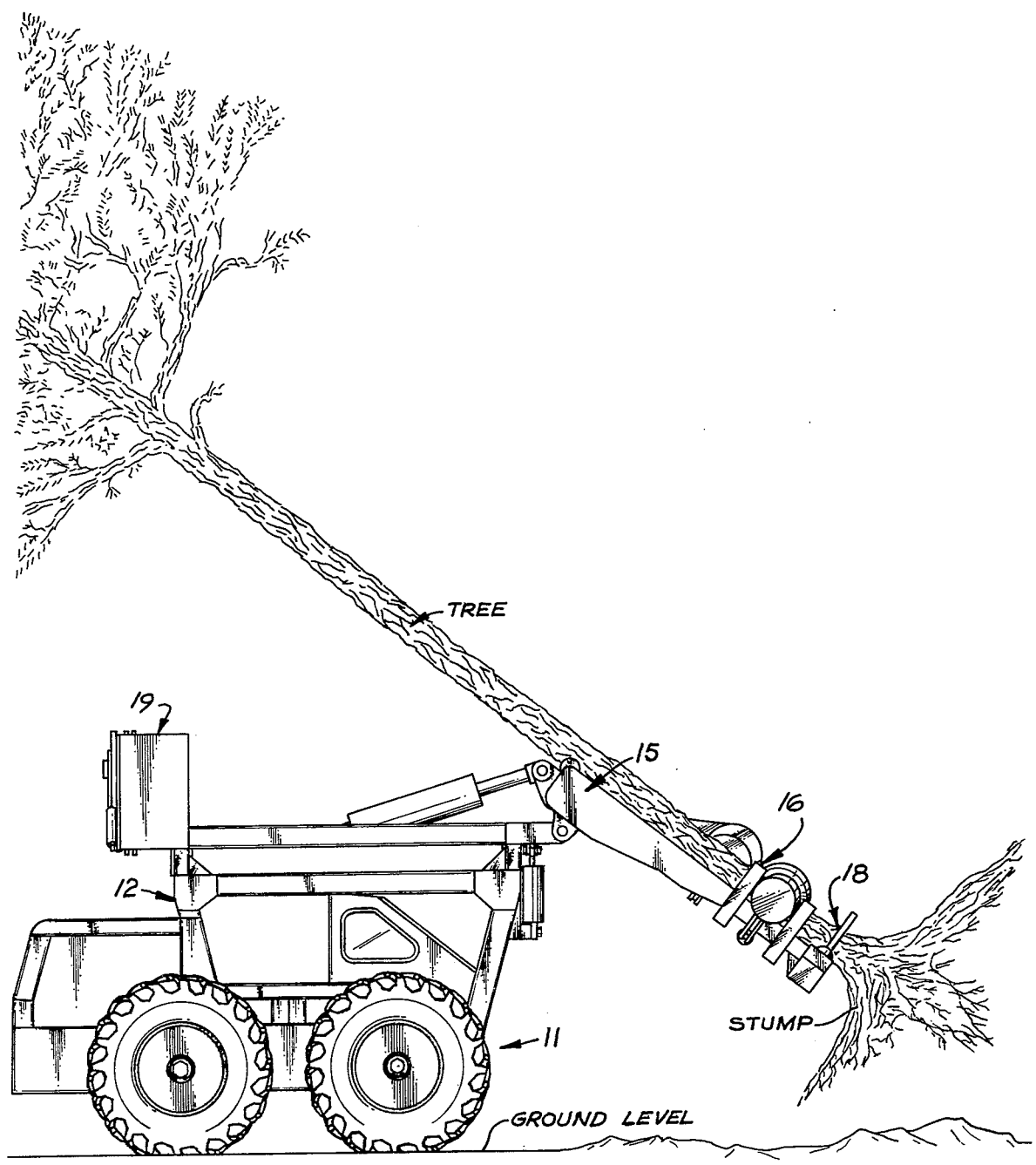

As illustrated in FIGS. 21-23, the machine 10 can be operated to remove the stump and roots of a tree along with the tree. Basically, this is a manual operation with the operator using selector switches 1SS-8SS. The machine is driven up to the tree with the bed 15 plumb with the tree as illustrated in FIG. 6. The operator then closes the traversing mechanism 16 with switch 4SS so that the tree is gripped. The machine 10 is then driven forwardly so that the roots on the near side of the tree are broken loose as illustrated in FIG. 21. The operator then backs the machine away from the tree so that the roots on the far side of the tree are broken loose as illustrated in FIG. 22. The operator continues to back the machine away from the base of the tree with the traversing mechanism 16 continuing to hold the tree onto bed 15. As the operator backs the machine 10, he raises the bed 15 with switch 2SS to the position shown in FIG. 23. This action breaks the tap root and removes the stump and roots with the tree. The operator then traverses the tree rearwardly through switch 8SS until the tree can be sheared with the cutting assembly 18 at the roots. The tree is then sheared by activating switch 1PB. The tree is then delimbed and cut to length as previously described.

While specific embodiments of the invention have been disclosed herein, it is to be understood that full use may be made of modifications, substitutions and equivalents without departing from the scope of the inventive concept.

We claim:

1. A compact tree processing machine for cutting trees substantially longer than said machine including:
   a prime mover movable along its longitudinal axis, and having a forward end and length substantially shorter than said tree to be harvested;
   a support frame mounted on said prime mover and fixed relative to said prime mover;
   a carriage frame pivotally mounted on said support frame for rotation about a roll axis spaced above, generally parallel to, and generally vertically aligned with the longitudinal axis of said prime mover, said carriage frame also longitudinally fixed with respect to said prime mover;
   a support bed pivotally mounted on the forward end of said carriage frame about a single generally horizontal bed pivot axis generally perpendicular to said roll axis; said bed pivot axis spaced above said prime mover at the foward end thereof, longitudinally fixed with respect to said prime mover and generally vertically aligned with a point immediately forward of the support area of said prime mover for movement of said support bed from a generally vertical plane immediately forward of said prime mover to a generally horizontal plane above said prime mover; the remote end of said bed opposite said pivot axis being adjacent the ground when said bed is in the substantially vertical plane;
   pivot means for selectively pivoting said bed about said pivot axis; and,
   roll alignment means for selectively pivoting said carriage frame and said bed about said roll axis.

2. The tree processing machine of claim 1 wherein said support bed has a longitudinal centerline and further including control means for selectively causing said roll alignment means to maintain said centerline of said bed generally vertically plumb when said bed is in its vertical plane.

3. The compact tree processing machine of claim 2 further including holding means carried by said support bed intermediate its ends for holding a tree onto said bed so that said tree will be pivoted about said bed pivot axis from a generally vertical upstanding position immediately forward of said prime mover to a generally horizontal position above said prime mover as said support bed is pivoted about said bed pivot axis.

4. The compact tree processing machine of claim 3 further including cutting means carried by the remote end of said bed for selectively severing said tree at its base while said tree is held on said bed.

5. The machine of claim 4 further including shifting means for selectively varying the distance between said holding means and said cutting means.

6. The machine as set forth in claim 4 wherein said holding means further includes traversing means for moving said tree longitudinally of itself with respect to said cutting means when said tree is in a generally horizontal position.

7. The machine of claim 6 further including delimibing means for delimbing the tree as it is moved by said traversing means.

8. The machine of claim 7 further including topper means for selectively severing the tree adjacent said delimbing means.

9. The machine as set forth in claim 6 further including measuring means for measuring the amount of movement of said tree longitudinally of said bed by said traversing means with respect to said cutting means.

10. The machine of claim 9 wherein said control means further operatively connects said traversing means, said measuring means and said cutting means to selectively stop the traversing of said tree in response to a prescribed amount of movement of the tree past said cutting means to activate said cutting means while the tree is so stopped to sever a prescribed length therefrom and to again activate said traversing means to move said tree longitudinally of itself.

11. The machine of claim 10 wherein said control means further operates said topper means when the diameter of said tree at said delimbing means reaches a prescribed minimum diameter.

12. The machine of claim 6 wherein said control means further causes said traversing means to exert a first force on said tree generally normal to the centerline of said tree and toward said support bed to hold it against said bed when said bed is in the vertical plane and to exert a second force on said tree generally normal to the centerline of said tree and toward said support bed when said bed is in the horizontal plane.

13. The machine of claim 12 wherein said control means further includes accumulator means for constantly urging said holding means toward said tree at said second force while allowing relative movement of said holding means toward and away from said bed.

14. The machine of claim 7 wherein said delimbing means includes a plurality of movable delimbing blades selectively engagable with the tree, said delimbing means carried by said carriage frame and positioned to engage the tree when said support bed is in its substantially horizontal pivotal position.

15. The machine of claim 14 wherein said delimbing blades are movable toward said tree in a plane substantially normal thereto when the tree is substantially horizontal and drive means for selectively moving said blades toward and away from said tree.

16. The machine of claim 1 further including a delimbing mechanism for removing the branches from the trunk of the tree and traversing means for moving the tree lengthwise of itself base end first when the tree is carried by said bed in its horizontal position; said delimbing mechanism comprising:

delimbing blade means defining a cutout therein, and including a cutting edge adjacent said cutout facing away from the base of the tree, the plane of said cutting edge lying generally parallel to the centerline of the tree as the tree is moved; and abutting means generally aligned with said cutting edge and spaced outwardly therefrom away from the centerline of the tree a predetermined distance; and, positioning means for positioning said delimbing blade means adjacent the tree so that the cutting edge passes along the tree trunk, said abutting means constructed and arranged so that said abutting means engages the branch outboard of the tree trunk after said cutting edge has made an initial cut into the branch at its joint with the tree trunk to cause the branch to separate from the tree trunk at the joint.

17. The machine of claim 16 wherein said delimbing blade means in said delimbing mechanism includes a plurality of delimber blades, each of said delimber blades defining said cutout therein and including said cutting edge and said abutting means, one of said delimber blades underlying the tree to support said tree and laterally fixed with respect to the centerline of the tree, and two of said delimber blades movably mounted with respect to said one of said delimber blades in opposition to each other, and movable toward and away from the centerline of the tree in a plane substantially normal to the centerline of the tree; and, wherein said positioning means is operatively connected to said two of said delimber blades to selectively move said two of said delimber blades toward and away from each other to cause said delimber blades to selectively engage the trunk of the tree.

18. The machine of claim 17 wherein said positioning means further includes forcing means for urging said two of said delimber blades toward each other into contact with the tree with a generally constant force while allowing relative movement of said two of said blades toward and away from each other.

19. The machine of claim 4 wherein said cutting means includes a shear mechanism comprising:
a shear housing;
a pair of opposed shear blades pivotally carried by said housing, both of said blades arranged for movement into and out of said housing in common cutting plane generally normal to said support bed to shear the tree, said holding means selectively locating the tree with respect to said shear housing so that the centerline of the trunk of the tree is generally normal to the cutting plane and operatively associated with said shear blades; and,
positioning means including a first fluid cylinder pinned to said housing and having a first piston rod pinned to one of said pair of shear blades so that an extension of the centerline of said first fluid cylinder passes through the trunk of the tree during shearing; and a second fluid cylinder pinned to said housing and having a second piston rod pinned to the other of said pair of shear blades so that an extension of the centerline of said second fluid cylinder passes through the trunk of the tree during shearing so that the line of force exerted on each of said shear blades by said piston rods is oriented so that the line of force thereof passes through the trunk of the tree during shearing.

20. The machine of claim 19 wherein each of said shear blade in said shear mechanism defines an elongate straight cutting edge thereon, each of said shear blades having a prescribed thickness so that as the cutting edges are forced into the trunk of the tree, the thickness of said shear blades is sufficient to exert a force on the wood fibers on the trunk of the tree at said cutting edges of said shear blades so as to axially tension the wood fibers sufficiently just prior to being cut by said cutting edges to reduce the force necessary to sever the tensioned wood fibers with said cutting edges of said shear blades.

21. The machine of claim 3 further including:
a. cutting mechanism for selectively severing the trunk of a tree;
b. stump clear positioning means movably connecting said cutting mechanism to the remote end of said support bed so that the distance between said holding means and said cutting means can be varied, said positioning means including a first fluid cylinder connected to said support bed and having a piston rod selectively extendable therefrom; a second fluid cylinder connected to said cutting mechanism and having a second piston rod selectively extendable therefrom, said first and second piston rods rigidly connected; and,
c. stump clear control means for independently controlling the extension of said first piston rod and said second piston rod so that said second piston rod can be fully extended and retracted to accurately locate said cutting mechanism with respect to said support bed independently of the position of said first piston rod so that said cutting mechanism can be selectively raised from its cutting position to clear a stump after said cutting mechanism has severed the trunk of a standing tree and returned to the cutting position after said cutting nmechanism has cleared the stump.

22. The machine of claim 21 further including a power source of pressurized fluid and a selectively extendable pressurized fluid connection connecting said power source to said cutting mechanism, said fluid connection comprising:
a. a first elongate tube connected to said power source;
b. a second elongate tube slidably receivable in said first elongate tube in sealing engagement therewith and connected to said cutting mechanism;
c. a first mounting block connected to said first elongate tube and defining a first fluid bearing surface therein;
d. a second mounting block connected to said second elongate tube and defining a second fluid bearing surface therein so that when said second tube is slidably received in said first tube and fluid under pressure is applied thereto, said fluid bearing surfaces in said first and second mounting blocks constantly urge said blocks away from each other;
e. a first bracket fixed mounted on said support bed; and,
f. a second bracket fixed mounted on said cutting mechanism in opposition to said first bracket and movable with said cutting mechanism, said first and second brackets each defining a pocket therein, said first mounting block removably received in said pocket in said first bracket and said second mounting block removably received in said pocket in said second bracket so that the fluid under pressure maintains said mounting blocks in engagement with said brackets while allowing said second mounting block to move with respect to said first mounting block as said cutting mechanism moves.

23. A method of harvesting a standing tree with a harvesting machine with a prime mover movable along its longitudinal axis comprising the steps of:
 a. gripping a generally vertically standing tree to locate same with respect to said machine with the tree immediately forward of the prime mover;
 b. severing the tree at its base while said tree is so gripped; and,
 c. selectively moving the severed tree with respect to said machine while it is so gripped by pivoting the tree from its generally vertical position to a generally horizontal position above the prime mover about a single primary pivot axis located above and immediately forward of the forward end of the prime mover, the primary pivot axis being longitudinally fixed with respect to the prime mover, whereby the top of the tree is moved back over the prime mover and the base of the tree is moved forwardly of the prime mover to maintain the tree and the machine in a stable position.

* * * * *